United States Patent [19]

Mattingly

[11] Patent Number: 5,150,295

[45] Date of Patent: Sep. 22, 1992

[54] COMPUTERIZED SYSTEM FOR JOINING INDIVIDUAL MAPS INTO A SINGLE MAP PRODUCT

[75] Inventor: William Mattingly, Huntsville, Ala.

[73] Assignee: Teledyne Industries, Inc., Los Angeles, Calif.

[21] Appl. No.: 526,144

[22] Filed: May 22, 1990

[51] Int. Cl.$^5$ ............................................. G06F 15/62
[52] U.S. Cl. ................................................... 364/420
[58] Field of Search ............... 434/130, 147; 364/449, 364/521, 420; 73/178 R; 340/990, 995, 998, 993

Primary Examiner—Gail Hayes
Attorney, Agent, or Firm—Beveridge, DeGrandi & Weilacher

[57] ABSTRACT

An improved method of making a larger map from individual 7.5 minute digital line graph (DLG) data is described herein. The process is fully automated and performed by a computer with minimal human interaction required. This eliminates errors and produces a more accurate final map product. The method includes conversion of the raw DLG data files into ARC/INFO format, locating the border arcs of each individual data set, edgematching the individual map data sets, and joining the data sets into a single, large map coverage. Any node along the border arc which cannot be automatically edgematched is noted in a special error file. A geographer then matches the unmatched edges which contain an error in the input data. A large map product is available as the product of the process.

12 Claims, 4 Drawing Sheets

COMPUTERIZED SYSTEM FOR JOINING INDIVIDUAL MAPS INTO A SINGLE MAP PRODUCT

BACKGROUND OF THE INVENTION

The invention relates to the art of map making. Geographic information is available in a variety of forms, and numerous Geographic Information Systems (GIS) have been implemented and are used throughout the world. These information systems allow organizations to display, manipulate and analyze geographical data.

The United States Geological Survey (USGS) is one of the major sources of raw geographical data at the present time. USGS transforms a hard copy of a map into a digital form. This is called a digital map. The digital data is stored on tape and sold to users in an ASCII format known as digital line graph (DLG) format (defined by USGS as *Digital Line Graphs from 1:100,000 Scale Maps* by the *Data User Guide* 2, available from USGS). This data is in a vector format. USGS provides DLG tapes on various topographical coverages including hydrology, roads, railroads, and miscellaneous transportation. Miscellaneous transportation may include data such as power lines, pipes, air strips, ski lifts, tramways and the like.

USGS provides DLG data blocks in map sections which cover a 7.5 minute by 7.5 minute area of the earth's surface (7.5 minute map). This area is equivalent to one-eighth of a degree longitude by one-eighth of a degree latitude. The area encompassed by a 7.5 minute map varies, depending upon the location on the earth's surface. Within the Continental United States, the area is typically about 10-11 km east to west by about 19 km north to south. More than 50,000 of USGS's 7.5 minute maps are required to completely cover the Continental United States (CONUS) for each type of coverage (i.e. 50,000 maps for roads, 50,000 maps for railroads, etc.). As a further example, the State of Kentucky requires 765 of the 7.5 minute maps to completely cover its borders.

It is often desirable to have a single map which covers a larger area than the 7.5 minute map. Also, it is often necessary to create a map which includes more than one topographical feature, for example, a map with both roads and railroads may be desired.

The Environmental Science Research Institute (ESRI) has developed a software package called ARC/INFO which is used for processing the data from DLG files. The DLG data files are not directly compatible with the ARC/INFO system. Before ARC/INFO can be used, the DLG data files must be converted into ARC/INFO format.

ARC/INFO includes a program which allows the user to convert the raw DLG data files into ARC/INFO format. This conversion program requires periodic human interfacing with the program. Thus an operator must be present throughout the conversion process to input the proper parameters to the computer at various stages in the conversion. The operator loads the tape, and the program prompts the operator for additional information. The system prompts the user for the DLG file name, the number of files to process and the name of the directory in which to store the data in. This is a long, time consuming operation which is subject to error because of the constant human interaction.

The second step in producing a larger map from the 7.5 minute map sections is an edgematching procedure, wherein the edge features of one map are matched to the corresponding features on the four surrounding maps. This process is completed in the prior art systems by a manual edgematching process. This process will be described in more detail below.

As shown in FIG. 1, a larger map 10 is often desired as opposed to the individual 7.5 minute maps 12. An enlarged version of the 7.5 minute map labelled A is shown in FIG. 2. Map A is shown to contain various arcs which represent topographical features (i.e. roads, waterways, etc.). It will be appreciated by those skilled in the art that an actual 7.5 minute map may contain hundreds or even thousands of these arcs.

As mentioned above, the edgematching process of the prior art systems requires a manual edgematching step. To match the edges, the two adjacent data sets representing the edges to be matched are called up onto a computer screen. The computer screen typically places these edges approximately one inch apart. For every node along an edge (16 and 26, for example), the operator must locate the corresponding node on the adjacent data set. The operator selects the end node of one of the edges, looks over at the adjacent edge, makes an interpretation of which feature on this edge he believes that the first end node should be joined to, and he selects this feature. The operator then enters a command on his keyboard that joins these two features together. This is called "snapping" the two features together. This manual matching process must be performed on every node along the edge, along every edge on the 7.5 minute map, and around every map that is to be joined. As mentioned above, there are more than 50,000 7.5 minute maps per coverage (i.e. hydrology, roads, etc.) to cover the Continental United States.

Those skilled in the art recognize the time consuming and tedious nature of this edgematching procedure. Furthermore, matching of every node requires a judgment on the part of the operator; hence, this process is highly error prone. The operators become tired and bored, nodes are completely missed, mismatched, and many other human errors may be involved. It is also a very time consuming process; therefore, it is also very costly in terms of man hours and money. Additionally, this process requires a graphic terminal to match the edges on.

Furthermore, the final product is also full of errors. It is virtually impossible to obtain an error free final map product.

The final steps in creating the map product are to correct the attribute files and to clean up any coverage which does not have the correct topology. Then, the various individual coverages (7.5 minute maps) desired in the final product are combined into a single map layer.

In the prior art systems, the user again was required to manually interface with the computer, this time to assure that the attribute files for each map matched up. The attribute file of each individual file (7.5 minute data file) had to be looked at individually to determine how many attributes were missing. The correct number of attributes cannot be determined until all of the files are inspected. After inspecting all of the attribute files, the operator then needed to determine the correct number of attributes, and enter any missing attributes into each individual file by means of a program routine called ADDITEM. ADDITEM is a routine that is a standard command in the ARC/INFO package which allows the user to enter attributes. The operator is required to enter the ADDITEM command over and over on the terminal. This process is also extremely time consuming and tedious.

The procedure for joining the individual maps into a single coverage was relatively simple for the user in the prior art systems. The user only needed to enter all of the individual file names for the maps that were to be joined. ARC/INFO would join these files into one map layer. This is also a very tedious chore in situations where hundreds or thousands of individual data files are being joined.

As noted above, the process of the prior art requires a large investment of time and money. Shown in Table I are the approximate times requires to process 256 DLS files using the prior art manual processing methods.

TABLE I

| Process | Time |
| --- | --- |
| 1. Convert DLG files into ARC/INFO, building topology, projecting, reading tapes, etc. | 100 man hours |
| 2. Edgematching (correcting map features to meet at the map borders). | 100 man hours |
| 3. Attribute correction and combining of individual maps into a single layer. | 32 man hours |
| TOTAL | 232 man hours |

Since this data is processed manually, there are typically numerous errors which are present in the processed data.

SUMMARY OF THE INVENTION

It is an object of this invention to provide a procedure for processing DLG data files in a more efficient and less costly manner.

Another object of this invention is to provide a surface area map product with dimensions larger than 7.5 minutes, wherein the map is error free.

Another object of the invention is to provide a fully automated process for converting DLG data files into ARC/INFO format. It is desired to totally eliminate human interaction in the DLG data files into ARC-/INFO conversion process.

Another object of the invention is to provide a fully automated edgematching procedure that eliminates human interaction and errors while edge matching the smaller map sections into a larger map area.

Another object of the invention is to provide a fully automated procedure for creating maps which contain a plurality of topographical coverages.

BRIEF DESCRIPTION OF THE DRAWINGS

These and other advantageous features of the invention will become evident from the following detailed description, the attached computer programs, and the attached figures,, wherein.

DETAILED DESCRIPTION OF THE PREFERRED EMBODIMENT

Figure 3:
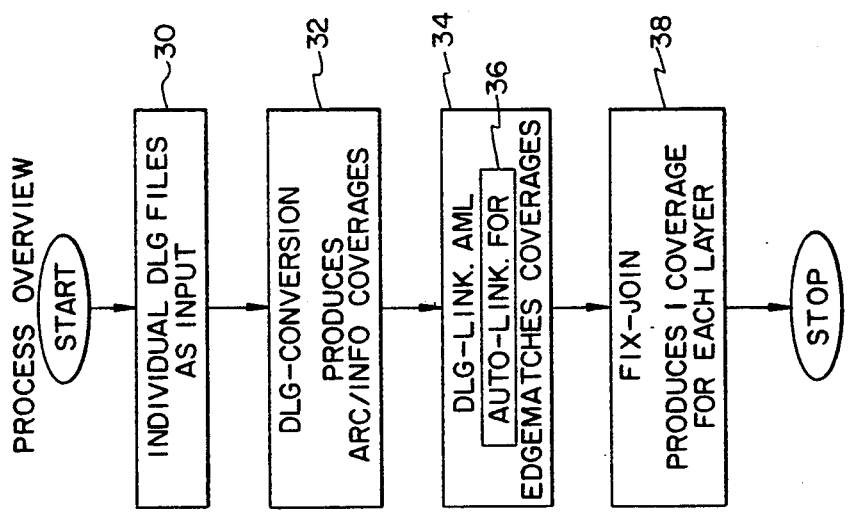
FIG. 3 is a flow chart of the overall process.

The invention is a computerized system which eliminates the need for human interaction in the map producing process. An overview of the process is shown in FIG. 3. The preferred embodiment of the invention uses FORTRAN programs, in particular, FORTRAN 77. In particular, the AUTO-LINK.FOR program was written in FORTRAN 77 on a VAX computer. The programs ending with the ".AML" portion are the interface to the ARC/INFO codes to drive the programs. The process initially receives the raw DLG data as input. A first computer program (DLG-CONVERSION) converts the raw DLG data for each 7.5 minute map into ARC/INFO format. ARC/INFO coverages are generated using the following data set naming convention:

H48N8103WOA wherein
H—the coverage type for hydrology. The different types of coverages are named as follows:
[H]ydrology,
[R]oads,
[T]rains (Railroads), and
[M]isc. Transportation (trails, etc.)
48 N8—represents the latitude of the Southeastern corner of the 7.5 minute map. 48 represents degrees, N means north of the equator, 8 represents 0.875 degrees. Since each coverage is one-eighth of a degree square, only the tenth of the degree is needed for identification purposes.
103 WO—103 degrees west longitude of the Southeastern corner, plus 0.00 degrees
A—this refers to the ARC/INFO type of data to be converted to, labelled according to the following convention:
[A]rea (polygons and lines),
[P]oints, and
[N]odes.

This procedure is fully automated. The raw DLG data is generated from map products, such as existing hard copy map products. These map products are put into a digital form and placed on a tape. The tape or digital map is available from USGS. This data is in a vector format. The DLG data tapes are loaded into the computer, the first and last DLG files to be processed are entered, the type of topographical coverage is entered, and the program is run. No additional user interaction is required.

The next step is the automated edgematching procedure. This was the most difficult and challenging aspect of perfecting the invention. The main program is called DLGLINK.AML. The computer matches each node on the border arc with the most closely matched node on the other map's border arc within the edit distance. The edit distance is preferably set to the smallest discernable distance that can be digitized on a map of that scale. A distance of 30 meters on 1:100,000 scale data is preferred. Often the DLG data which is obtained from USGS contains errors, because USGS uses manual processes in producing the DLG files. If an error is present in the raw DLG data, the computer will not be able to match the node. A match is searched for over a distance of five times the edit distance. If none is found, the program notes this node failure and its location in a separate error file. This error file is called the DLGLINK.LOG file, or the "Log File" in the programs. These unmatched nodes must be manually checked by a geographer after the remaining edges are matched. This edgematching process will be described in more detail below.

The final procedure step is the correction of the attribute files for the coverage and the correction of any coverage which lacks correct topology. The desired coverages are joined into a single output coverage, and a map is the final product. The program for the last procedural steps is called Fix-Join.

The "Fix" part of this program assures that the files have the correct topology and the correct number of attributes. Each 7.5 minute map data set includes a coverage attribute file. To join the 7.5 minute map sections, the coverage attribute files must match exactly. This attribute file contains a record for each arc in the coverage, and details on what the arc is (e.g. read type, HWY 101, HSY 20, US 64, etc.). This program determines the number of attributes required in all of the individual 7.5 minute maps and adds the correct attributes to each individual file for any that are missing. This assures that the coverage attribute files in the adjacent map sections match up exactly, which, in turn, allows these map sections to be joined together into a single coverage. This process is fully automated, thus the need for human interaction is eliminated.

The "Join" part of this program also saves time for the operator. This is the part of the system which joins all the individual maps into one map. The operator need only put in the file name for one of the files to be joined. Recall that the prior art system previously required the operator to enter every file name to be joined together. In the system in accordance with the invention, the computer will automatically generate the remaining file names based on the latitude and longitude coordinates of a single data file. This feature saves a substantial amount of time, especially if hundreds or thousands of individual coverage maps are involved.

Other quantitative data may be obtained from the data, such as the miles of railroad within the area, percentage of the surface over a certain elevation within the area and the like. Also, other topographical map features may be overlaid or superimposed over this map. Buildings, military installation locations, or other geographical features may be included in the map after the larger map has been completed.

For purposes of comparison, Table II shows the employee time and computer time required to process the DLG data into a finalized map product. By a finalized map product in this specification, the inventor is referring to hard copy map products, map products stored on tape or in other computer generated and readable forms, or maps displayed on a computer screen. Hard copy map products may be generated by any ARC-/INFO supported plotter, this equipment being known to those skilled in the art. The final map product may be used for a wide variety of purposes. The maps may be used to create a library of maps which document the construction and/or development of a geographical region. Environmental conditions in a region can be monitored over a time period. Various types of geographic analysis may be performed on the map data. For example, the miles of roadways or railroads over a region may be ascertained. The surface area of a region covered by water or over a certain elevation may be determined. The maps generated may be overlaid with other topographical features, such as the location of particular buildings or other landmarks, military base locations and other items of interest to the user. These additional topographical features may be digitized into the map or superimposed over the final map produce.

As in Table I, 256 DLG files were processed using the procedures in accordance with the invention.

TABLE II

| Process | Computer Time | Man Time |
| --- | --- | --- |
| 1. Convert DLG files into ARC/INFO, building topology, projecting, reading tapes, etc. | 8 hrs. | 0.1 man hours |
| 2. Edgematching (correcting map features to meet at map borders). | 8 hrs. | 0.1 man hours |
| 3. Attribute correction and combining of individual maps into a single map layer. | 2 hrs. | 0.1 man hours |
| TOTAL | 18 hrs. | 0.3 man hours |

Note the dramatic time savings that is realized when utilizing the process of the invention, as opposed to the human interfacing process of the prior art. A further advantage to the process of the invention is the fact that errors are virtually eliminated. Any edge which the computer cannot match is noted in an error file as mentioned above. These edges must be matched manually by a geographer.

Since the process is fully automated, the process may be completed by the computer in the evenings or over weekends. This keeps the computer available for normal business purposes during working hours.

Returning to FIGS. 1 and 2, the edgematching process, performed by the program DLGLINK.AML, will be described in more detail. When creating a large map 10 from the 7.5 minute maps 12, it has been found that the automated edgematching process is the most difficult and technically challenging aspect of the procedure.

It is preferred that the edges of the various maps be matched by a checkerboard method. The edgematching process will be described with particular reference to the 7.5 minute map designated A in FIGS. 1 and 2.

Figure 1:
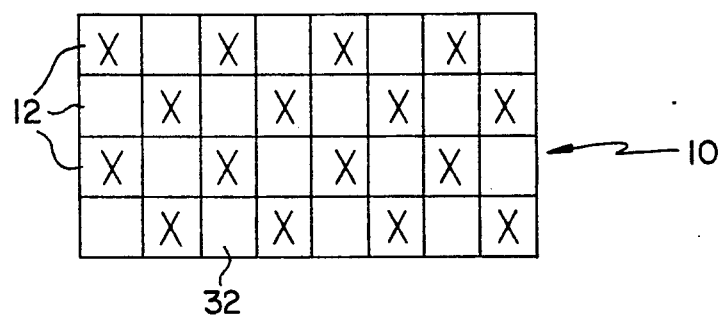
FIG. 1 shows a diagram of 32 7.5 minute maps in their edgematched and joined format.
Figure 2:
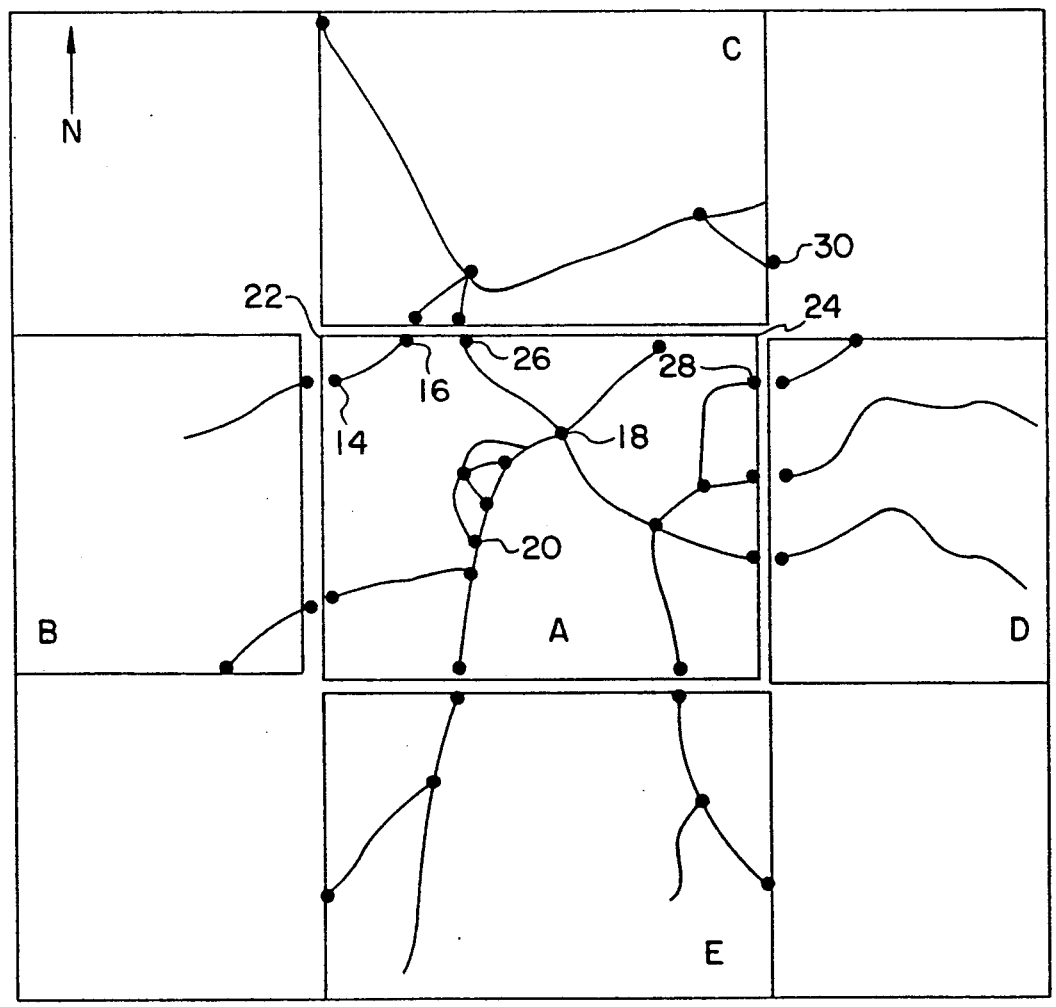
FIG. 2 shows an enlarged diagram of one 7.5 minute map section before edgematching, along with the four adjacent map coverages.

The 7.5 minute map A shown in FIG. 2 contains several arcs. An arc is comprised of nodes and vertices, wherein the nodes are the endpoints of the arcs. Reference numbers 14 and 16 are nodes, and these nodes define an arc. Vertices are represented by numbers 18 and 20. In actual map data, a 7.5 minute map may contain hundreds or thousands of arcs. Using the checkerboard method, the arcs of map A are adjusted to line up with the arcs of maps B, C, D and E. This method of edgematching is called the checkerboard method because only the maps marked by an "X" in FIG. 1 are allowed to be adjusted by electronically "shifting" the map edge. The maps which are not marked by an "X" are not electronically adjusted.

Each 7.5 minute map also contains four arcs which are not part of a map feature at all. These arcs are the border arcs which define the outer edges of the map. One of the border arcs for map A is shown between points 22 and 24 in FIG. 2. The USGS codes these otherwise useless border arcs as −9999 in the attribute file.

By using nodes which exist along the border arcs, the process for edgematching becomes much less complicated and less time consuming. Matches of internal arcs are eliminated. Furthermore, using only nodes from the border arcs prevents arcs from being drawn into the border and collapsing the arc. The edgematching process between maps A and C along border arc 22-24 will be described.

Each map has four border arcs, namely, East, West, North and South. The nodes and locations of the nodes for map A are stored in four different arrays, one array for each border. The same storage process is completed with map C. Because map A is being matched to map C, only the North nodes of map A need to be tested against the South nodes of Map C. This process prevents a possible erroneous match of node 28 to node 30. If all of the nodes along the North border of map A have a corresponding match with the nodes on the South border of map C, then the edge has been successfully edgematched. If a node fails to have a match, the location of the failure is logged into a file, as described above. These unmatched nodes must be manually checked by a geographer however, in the overwhelming majority of cases the map edges are successfully matched.

The edgematching process is completed for all four borders of map A. If an edge coverage is missing, such as on an outside piece of the larger map (see 7.5 minute map 32 in FIG. 1), the value "NONE" is passed, and the edge is assumed to be matched.

In determining which node to match to the corresponding node in the other map, the node is matched to the node with closest value within a predetermined range and within the edit distance. The edit distance is input by the system user. It is preferred that the edit distance be set to the smallest discernible distance that can be digitized on a map at the scale being used. As noted above, a 30 meter edit distance is preferred on 1:100,000 scale data. If a match is found, the two nodes are snapped together. If a node needs to be electronically moved, the node alone is not moved. Rather, the entire coverage, including all of the arcs, is moved proportionally. This type is movement is called "rubbersheeting".

If all of the four borders are matched with the surrounding borders automatically, there is no need for manual inspection of the geographic data. The matching process is more accurate than the prior art systems, because there is no human interaction, thus, errors are eliminated.

The process of the invention is used to output a final map product in hard copy form. Other topographical features may be overlaid or superimposed onto the map, such as military installations, buildings or other geographic features. Other geographic analyses may be performed on the finalized map data, such as the number of miles of roads or railroads, the percentage of the surface area that is covered by water, the percentage of the area above a certain elevation etc. Other types of geographic analysis will be apparent to those skilled in the art.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM

An algorithm of the various computer programs used will be described in conjunction with FIGS. 3-6 and the attached computer codes.

FIG. 3 shows the Process Overview. The system begins by receiving the individual DLG data files as input, as shown at 30. The first part of the process, called DLG-CONVERSION 32, transforms the raw DLG data files into ARC/INFO format.

After the data is in ARC/INFO format, the information is processed by a program called DLGLINK.AML 34. DLGLINK.AML is used to edgematch the individual DLG data files to the surrounding data files. The DLGLINK.AML recursively calls a program called AUTO-LINK.FOR 36. DLGLINK.AML sends the necessary information to AUTO-LINK.FOR, and AUTO-LINK.FOR is the program which actually matches the adjoining edges. The matched results are sent back to DLGLINK.AML, which stores this data and sends the next data sets to be matched to AUTO-LINK.FOR.

After all of the edges are matched, the information is processed by a program called Fix-Join 38. Fix-Join cleans any topology with mistakes and adds any necessary data to the attribute files. The attribute files of the data sets must match exactly before the individual maps may be joined. After the data sets are fixed, the individual map sections are joined into a single map layer. A hard copy may be made. Various map layers, such as a railroad layer and a road layer, may be added together to get a more detailed map. Other map features may also be added, or other geographic analysis may be run on the data as discussed above.

Figure 4:
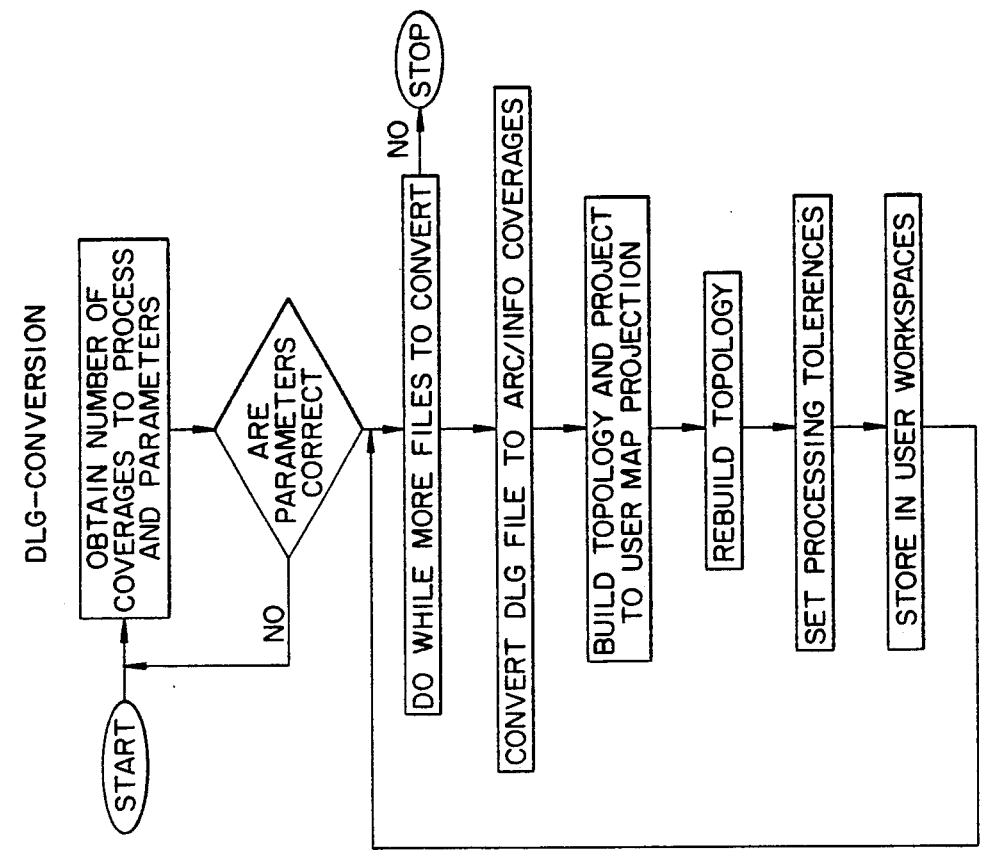
FIG. 4 is a flow diagram of the DLG-CONVERSION process.

The DLG-CONVERSION program is shown diagrammatically in FIG. 4. This program is to convert the raw DLG data files into ARC/INFO format. The program, first prompts the operator for the parameters of the run. The input parameters are the base names of the DLG file to convert, the first DLG file to process and the last DLG file to process. The program double checks with the user that all of the input data was correct. The program also prompts the user for the pathnames of the coverages, for example, hydrology, roads, railroads or miscellaneous transportation coverages. Their is also a double check feature on this data input step. Each type of layer is stored in a separate workspace, thus enhancing performance.

The main program calls a Routine named READ-DLG-HEADER. This routine calls the DLG file to determine the type of layer, UTM zone, and latitude and longitude coordinates of the southeast corner of the 7.5 minute map. This information is used to generate the map name in ARC/INFO format. This format was described above. The DLG-FILE name generated by READ-DLG-HEADER includes the map scale (which is used to set the tolerances and edit distance), the UTM zone (for use in projection, UTM stands for Universal Transverse Mercator, a standard map projection known to those skilled in the art), the latitude and longitude coordinates, and the coverage type. The READ-DLG-HEADER opens the appropriate DLG file and obtains the necessary information to name the coverage, UTM zone for projection, tolerences and coverage type. The coverage name is in the following format: [.HYDRO]H103W036N2A([.HYDRO] refers to a computer directory; H corresponds to a hydrology coverage: 103WO corresponds to 103.00 degrees west longitude;

36N2 corresponds to 36.25 degrees north latitude; and A represents an Area ARC/INFO coverage). This coverage name is returned to the main program, DLG-CONVERSION.

DLG-CONVERSION checks the input data for polygon topology. Polygon data is coded A at the end of the ARC/INFO format convention. If polygon data exists, then a topology is built with the polygon option (BUILD is a standard ARC/INFO command). The polygon topologies for all of the data files are joined by JOINITEM (a standard ARC/INFO command).

The presence of a Line topology is checked next, in the same manner as the polygon topology, and a topology with the line option is built. Similar operations take place on the Point topology and the Node topology.

If the coverage is a hydrology coverage and it includes a polygon topology but no line topology, it is a situation where the entire map area is a large lake or sea. In this case, the line topology must be built in and coded as −9999 to indicate that the lines are border arcs.

The temporary DLG attribute files are deleted. The coverages for the various types of topology (area, points, and nodes) are projected to the user output projection system and stored under the appropriate ARC/INFO naming convention. A routine called PROJECT-COVERAGE projects the coverages to the user's base projection system. Various base projection systems may be used, for example, state plane, ALBERS, Lambert, or others. The choice of projection system depends on what projection is used by the user in his normal mapping process. This choice is deemed to be within the level of normal skill in the art.

If a polygon topology coverage exists, it must be rebuilt after projecting it. The tolerance levels are set to the default values and the topology is copied into the user's work space with the ARC/INFO naming conventions described above.

The above procedures are performed on every DLG data file which is input into the system. After all the data files are in ARC/INFO format, the process for edgematching the data files begins.

Figure 5:
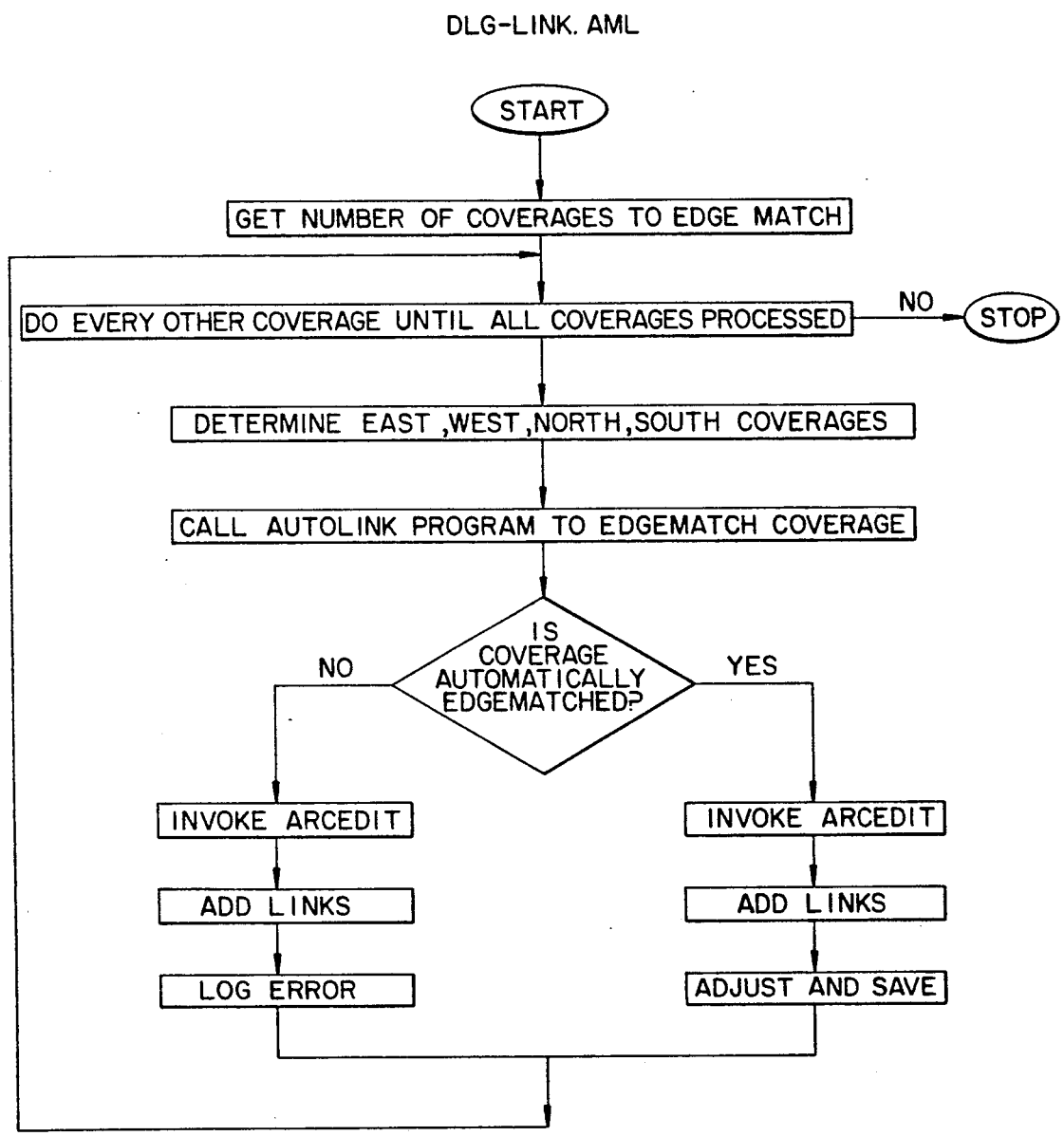
FIG. 5 is a flow diagram of the DLGLINK.AML process.

The program which is used to edgematch the maps is called DLGLINK.AML, shown as a flow diagram in FIG. 5. This program recursively calls the program AUTO-LINK.FOR (AUTOLINK in FIG. 5), which in turn matches each map with the surrounding four map coverage sections(AUTO-LINK.FOR may also be referred to as DLGLINK in some of the program codes, flow diagrams and algorithms.)

DLGLINK.AML accepts the user's parameters, which include: the name of the Southeast coverage, the horizontal coverage size in decimal degrees, the vertical coverage size in decimal degrees, the number of horizontal coverages and the number of vertical coverages. The coverage name, which is generated by the routine COV_NAME. enables the system to ascertain the location of the southeast most corner and the type of coverage (roads, etc.). This name is generated in the standard naming format for the coverage name described above. The latitudinal and longitudinal coverages are determined from the input data. DLGLINK.AML also creates the error file called DLGLINK.LOG, Any coverage that is unable to be matched automatically is noted in this file. After all of the automatic matching is complete, the locations of the edges which were not matched are disclosed to the operator. These locations must be checked manually by a geographer before the maps can be joined.

From the input data, the checkerboard pattern described above is generated. The coverages for the east, west, north and south directions are determined for the first map section to be matched. Only every other map in the horizontal and vertical directions are actually adjusted by the computer, thus creating the "checkerboard pattern". The fatal error file "FATAL.ERROR" is created, after any previously created FATAL.ERROR file is deleted. If this file is not deleted at the time when the AUTO-LINK.FOR program completes the edgematching process for this map, then a fatal error was encountered when matching the map section. The location of the error is stored in DLGLINK.LOG.

After the error file is created, the AUTO-LINK.FOR program is called. For each map section which needs to be matched, DLGLINK.AML recursively calls the AUTO-LINK.FOR program. This program will be discussed in more detail below.

After all of the edges for the first map section are matched, the east, west, north and south tables for the next map section are generated. Any existing FATAL ERROR file is deleted and a new FATAL ERROR file is generated. AUTOLINK.FOR is called again. This process repeats itself for every map section in the checkerboard which needs to be matched.

DLGLINK.AML also calls a routine called GETCOVS. This routine checks the input north, east, west, and south coverages of the 7.5 minute maps to determine when the data is at the edge of the final map. When at the edge, the value "NONE" is passed, to tell the system that it is at the map edge, and the edge is assumed to be matched as it is. GET-COVS further calls the routine COV-NAME, which generates the proper latitude and longitude coordinates which are used by GET-COVS to determine if the data is from an edge location.

As mentioned above, DLGLINK.AML calls the program AUTO-LINK.FOR for each map section which must be matched. This program takes advantage of the fact that DLG data codes the border arcs as −9999. If all of the nodes along the edge are matched to the adjacent coverage nodes, these nodes are snapped together, and the edge has been automatically edgematched. If any edge fails at only one node, the error file is created and the location is noted, as described above. The following criteria are used to generate the links, A) Only nodes on border arcs coded −9999 are considered;
B) Only one edge of coverage is compared to the corresponding edge of the adjacent coverage (i.e. north edge of one map compared to the south edge of the adjacent coverage map);
C) Nodes are matched to the closest node within the edit distance to create the link;
D) Only one link is allowed per node;
E) If all the border nodes (snapcover nodes) are linked, the edge is linked; and
F) If all the edges are linked, the coverage is linked.

AUTO-LINK.FOR first initializes a variety of ARC/INFO subsystems by calling the following interface routines which are available to all ARC/INFO users: TTINIT, LUNINI, AMLINI, VINIT, GETINT, MINIT, MESINI, MESIAM, and AMLTTY. These routines set up the environment to receive parameters from DLG-LINK.AML. These are generic routines for interfacing with the ARC/INFO. The user parameters are read in, which include the edit coverage, the east border coverage, the west border coverage, the north border coverage and the south border coverage. The edit distance is set to 30. Next the error file and the output files are created.

The subroutine PROC-COV is used to open and read in the data of the attribute file of the map to be matched. If the arc is coded less than zero, this program recognizes this as a border arc. If it is a border arc, the nodes are recorded. If the slope of the line between the nodes is between −45 degrees and +45 degrees, the nodes are placed in a north/south table. If the slope is not in that range, the data is stored in an east/west table. The midpoint is then located at half way between the minimum and maximum node location entries. Horizontal lines have nodes on either the east or west sides and vertical lines have nodes on either the north or south sides. The two east/west and north/south tables are divided into the four coordinate directions (east, west, north and south) by comparing to the midpoint.

After the nodes for the map to be matched are placed in the proper coordinate tables, the nodes in each table are then sorted and placed in X,Y order. The X and Y coordinate values depend on the map projection. For UTM, typical coordinate values would be (650,000, 4,170,330). The EDITCOV nodes (i.e. the nodes being adjusted to match the four adjacent coverages) are also sorted into X,Y order by a "bubble sort".

Each edge is processed, unless the edge has been labelled "NONE", which corresponds to a large map edge piece. A logic variable called BAD-EDGE is set to "false"; if BAD-EDGE becomes "true", the coverage cannot be autolinked.

The programs are designed with the commands that are needed to interface with the ARC/INFO system. The commands needed are: arcedit, set edit feature, editcover, coordinate keyboard, and add. To process a cover, the nodes of the adjacent maps are separated into the north, south, east and west edges for the cover. This sorting is done by the PROC-COV routine also. First the west edge of the map is matched to the east edge of the "cover" map (the adjacent map). The location of each node in the adjust map is compared to the cover nodes within the edit distance, and the closest cover node within the edit distance is returned. Once a matching node is found, the ARC/INFO ASCII command to add the link is executed. The links are later added by the ARCEDIT command.

First, the closest match is sought within the edit distance. A subroutine called FIND-CLOSEST is used for matching. If no match within the tolerance limits is found within the edit distance, the distance is expanded to five times the original distance. If no match is found in this range, an error is noted by the computer, and the logical variable BAD-EDGE is changed to "true". If a match within the tolerance limit is located in the wider range, this match is snapped using the ARC/INFO commands, for example, ARCEDIT and ADD.

This method of finding the closest match is repeated for the east, south, and north edges of the map to be matched. If no bad edge is found around all four edges of the map to be matched (i.e. BAD-EDGE=.FALSE. at the end of the matching steps), then the map is adjusted and saved. If a failure is noted, the error is noted in the error file.

The subroutine FIND-CLOSEST is used to find the closest node match within the edit distance. If a match within the tolerance limit is found, the closest match is located by a binary search, and the location of the successful cover node is passed back to the main program.

Figure 6:
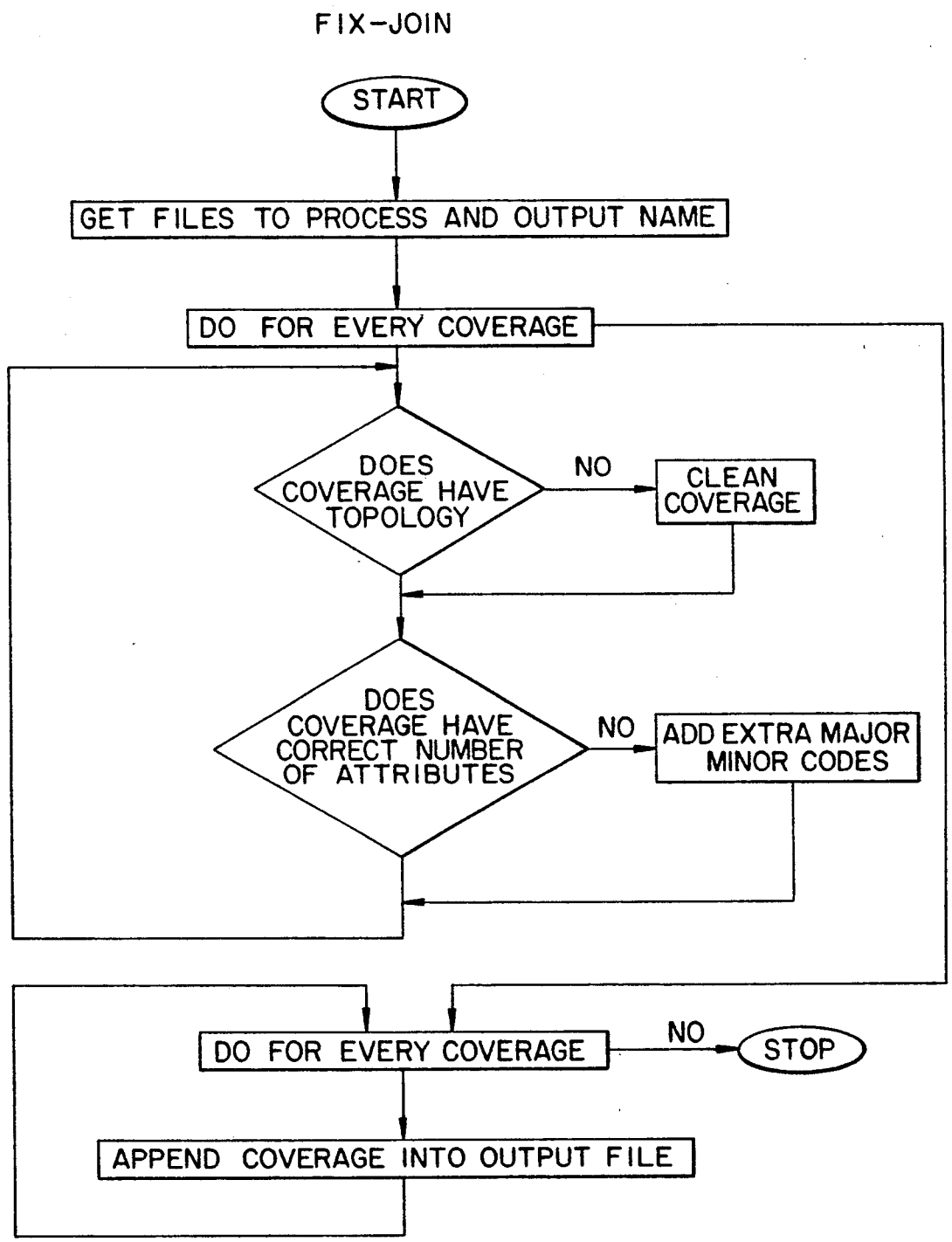
FIG. 6 is a flow diagram of the FIX-JOIN process.

The final steps in the matching process are completed by a program called FIX-JOIN, shown in FIG. 6. As discussed above, in order to snap to individual maps together, the attribute files must match each other exactly. Fix-Join receives as input: the name of the southeast coverage, the horizontal size in decimal degrees, the vertical size in decimal degrees, the number of horizontal coverages and the number of vertical coverages. Default numbers of attributes are preset in two files called "MINOR" and "MAJOR". The following steps are repeated until every attribute file has the same number of MAJOR and MINOR code pairs.

First the latitude and longitude of the southeast corner are used to generate the coverage name. These coordinates are incremented during the successive loops. When lines are shifted during the edge matching process, the lengths of lines, the areas of polygons, and the location of nodes are changed. When this occurs, the coverage is said to not be "clean". If the coverage is a network coverage (Area) and it is not clean, the coverage is first cleaned with the polygon option. If the coverage lacks line topology, "topology" referring to the relationship of map features to one another, the topology is cleaned with the line option. "Clean" and "Build" are ARC/INFO procedures which are used to re-establish the topology after a shift during edge matching. To determine the number of PAT (Polygon Attribute Table) files, subtract 16 from the number of attribute files and divide the result by 12. To determine the AAT(ARC Attribute Table) file number, subtract 28 from the number of attribute bytes. This provides the number of MAJOR and MINOR codes for the coverage.

If the number of attributes in the PAT and AAT files do not match the maximum number of attributes in PAT-MAX and AAT-MAX, a single item is added for all missing attribute pairs. The items are added with the ARC/INFO ADDITEM command discussed above. Preferably, a single ADDITEM command is used to reduce the input/output overhead.

If any file has more attributes than the default amount or the previous PAT-MAX or AAT-MAX amount, the values in PAT-MAX or AAT-MAX are increased to correspond to the higher value.

The final step is to append or join the multiple 7.5 minute maps which have been matched into a single output coverage. From the coordinates of the southeast corner, the coverages are appended together as the latitude and longitude coordinates are incremented. If the coverage has been matched, the coverage is appended to the surrounding coverages. A large map product is produced as the final product. Several map layers may be added together and superimposed onto a single map.

A copy of the program codes described above are attached to the end of this specification, along with flow diagrams and algorithms of these codes. This material will be understood by those skilled in the art. All codes, flow diagrams and algorithms referred to herein and attached to this specification are relied on and incorporated by reference.

While the invention has been described in conjunction with particular embodiments, various modification may be made without departing from the invention, as defined in the claims.

```
&ARGS cov,hsize,vsize,hnum,   um
/* DLGLINK.AML       Version 1.1        Teledyne Brown Engineering
/*                   Copywrite 1989 - Teledyne Brown Engineering
/*
/*
/*
/*
/* Purpose: This AML is the main driver to the DLGLINK fortran program to
/*          automate the edgematching process for DLG coverages.
/*          This program figures out the proper coverages to be used for
/*          edgematching and repetively calls the DLGLINK fortran program
/*          to create a list of LINKS.  The links are written into an AML
/*          file which is executed ADD_LINKS.AML.  The AML enters ARCEDIT
/*          adds the links and adjusts the coverage if all the edges automat
/*          properly.
/*
/*          Finally the AML may create a file called DLGLINK.LOG.  This
/*          file contains any coverages that were not adjusted because the
/*          computer could not make a determination for a LINK.  These
/*          coverages will have to be manually inspected before adjusting.
/*
/*                              VERSION 1.1
/*
/*    change:
/*          Aml now takes parameters arguments.  This allows aml to be
/*          called from other amls.  Removed all global varaibles.
/*
/* Start a watch file, If one has not already been activated by the user
&IF [Show &watch] = &OFF &then &do
   &type Activating Watch file DLGLINK.WAT
   &watch DLGLINK.WAT
   &end
&else &type Using already activated watch [Show &watch]
&TYPE
&type DLGLINK version 1.1
&type
&type Copywrite 1989 - Teledyne Brown Engineering
&type
&typ  This program will automatically edge match the coverages converted
&typ  by DLG_CONVERSION.  A log file will be created DLGLINK.LOG which
&typ  lists the coverages that the DLGLINK could not process automatically.
&typ /*  SET SNAPPING DISTANCE FOR AUTOLINK
&S .SDIST := 30.01
&IF [NULL %cov%] &THEN &S cov := [Response 'Enter South Eastern Coverage Nam
&TYPE
&if ^ [Exists %cov% -cover] &then &DO
    &TYPE %cov% does not exist
    &end
&s covTYPE := [substr %cov% [length %cov%] 1]
&s .ctype := [substr %cov% 1 1]
&s dd := [substr [before %cov% N] 2]
&s fract := [substr [after %cov% N] 1 1]
&select %fract%
   &when 0,5
      &s fract := %fract%00
   &when 1,6
      &s fract := %fract%25
   &when 2,7
      &s fract := %fract%50
   &when 3,8
      &s fract := %fract%75
   &end
&s dd_lat := %dd%.%fract%
&s dd := [substr [before [after %cov% N] W] 2]
&s fract := [substr [after %cov% W] 1 1]
&select %fract%
   &when 0,5
      &s fract := %fract%00
   &when 1,6
      &s fract := %fract%25
   &when 2,7
```

```
        &s fract := %fract%50
    &when 3,8
        &s fract := %fract%75
    &end
&s dd_long := %dd%.%fract%
&S .DD_LAT  := %DD_LAT%
&S .DD_LONG := %DD_LONG%
&IF [NULL %hsize%] &THEN &s hsize := [Response 'Enter Horizontal size of cov
e in Decimal Degrees' .125]
&IF [NULL %vsize%] &THEN &s vsize := [Response 'Enter Vertical size of cover
in Decimal Degrees' .125]
&type
&IF [NULL %hnum%] &THEN &s hnum := [Response 'Enter number of Horizontal Cov
es' 8]
&IF [NULL %vnum%] &THEN &s vnum := [Response 'Enter number of Vertical Cover
' 4]
&type
&IF [EXISTS DLGLINK.LOG -FILE] &THEN &S CODE := [DELETE DLGLINK.LOG]
&S xnum := %hnum% - 1
&S ynum := %vnum% - 1
&IF %.CTYPE% = 'M' OR %.CTYPE% = 'T' &THEN &s .sdist := 100.0

&type Starting DLGLINK at [Date -vfull]
&do x := 0 &to %xnum% &by 2
    &do y := 0 &to %ynum% &by 2
        &s DD_lat  := %.dd_lat%  + ( %Y% * %vsize% )
        &s DD_long := %.dd_long% + ( %x% * %hsize% )
        &call get_covs
        &IF %edtc% NE NONE &THEN &DO
            &type ************** Processing %edtc% ***********************
            &IF [EXISTS FATAL.ERR -FILE] &THEN &s code := [delete FATAL.ERR.1]
            &S UNIT := [OPEN FATAL.ERR.1 CODE -WRITE]
            &S CODE := [CLOSE -ALL]

&data r wwm$src:dlglink
%edtc%
%ecov%
%wcov%
%ncov%
%scov%
%.sdist%
&end
            &ECHO &ON
            &IF [EXISTS FATAL.ERR.1 -FILE] &THEN &DO
                &TYPE fatal error during link generation ....
                &stop
                &end
            &r add_links.aml
            &ECHO &OFF
            &type [date -vfull]
            &end
        &end
    &end &do x := 1 &to %xnum% &by 2
    &do y := 1 &to %ynum% &by 2
        /* check coverages and check for proper topology
        &s DD_lat  := %.dd_lat%  + ( %Y% * %vsize% )
        &s DD_long := %.dd_long% + ( %x% * %hsize% )
        &call get_covs
        &IF %edtc% NE NONE &THEN &DO
            &type ************** Processing %edtc% ***********************
            &IF [EXISTS FATAL.ERR.1 -FILE] &THEN &s code := [delete FATAL.ERR.1]
            &S UNIT := [OPEN FATAL.ERR.1 CODE -WRITE]
            &S CODE := [CLOSE -ALL]
            &data r wwm$src:dlglink
%edtc%
%ecov%
%wcov%
%ncov%
%scov%
%.sdist%
&end
```

```
        &ECHO &ON
        &IF [EXISTS FATAL.ERR.1 -FILE] &THEN &DO
            &TYPE fatal error during link generation ....
            &stop
            &end
        &r add_links.aml
        &ECHO &OFF
        &type [date -vfull]
        &end
    &end
  &end
&type
&type Autolink completed at [Date -vfull]
&type
&TYPE Watch file [show &watch] still active ...
&return &routine cov_name
&s fract := [Substr [After %t_lat% .] 1 1]
&if [quote %fract%] < [quote 0] &then &s fract := 0
&s tcov := %.ctype%[before %t_lat% .]N%fract%
&s fract := [Substr [After %t_long% .] 1 1]
&if [quote %fract%] < [quote 0] &then &s fract := 0
&s tcov := %tcov%[before %t_long% .]W%fract%%covTYPE%
&return
&end &routine get_covs
&s t_long := %dd_LONG%
&s t_lat := %dd_lat%
&call cov_name
&if [exists %tcov% -cover] &then &s edtc := %tcov%
&else &DO
    &s edtc := NONE
    &return
    &end
&s t_long := %dd_LONG% + %hsize%
&s t_lat := %dd_lat%
&call cov_name
&if [exists %tcov% -cover] &THEN &s wcov := %tcov%
&else &s wcov := NONE
&s t_long := %dd_LONG%
&s t_lat := %dd_lat% - %vsize%
&call cov_name
&if [exists %tcov% -cover] &THEN &s scov := %tcov%
&else &s scov := NONE
&s t_long := %dd_LONG% - %hsize%
&s t_lat := %dd_lat%
&call cov_name
&if [exists %tcov% -cover] &THEN &s ecov := %tcov%
&else &s ecov := NONE
&s t_long := %dd_LONG%
&s t_lat := %dd_lat% + %vsize%
&call cov_name
&if [exists %tcov% -cover] &THEN &s ncov := %tcov%
&else &s ncov := NONE
&RETURN /* Dlg_Conversion              Version 2.0          Teledyne Brown Eng
/*                              Copywrite 1989 - Teledyne Brown Engineering
/*
/*                                    Version 1.0
/*
/* Purpose:
/*         This routine converts the raw DLG files which were read onto dis
/*         using copy.  The files are converted to ARC/INFO coverages for
/*         [A]rea (Polygons and Lines), [P]oints, ands [N]odes.  Coverages
/*         are named using the following conventions:
/*                             H48N8103W0A
```

```
/*                      [H]ydrology              [A]rea
/*                      [R]oads                  [P]oints
/*                      [T]rains                 [N]odes
/*                      [M]isc. Trails
/*
/*          48N8 is the Latitude of the SE corner, where 48 is the degrees a
/*          8 represents .825 degrees.  Because each coverage is 7.5 minutes
/*          square we need only represent the tenth of a degree.
/*          103W0 is 103 degrees Longitude and .00 degrees.
/*
/* Variables:
/*              base_name           ....  Dlg pathname not including version nur
/*              start_version       ....  First DLG file to process
/*              end_version         ....  First DLG file to process
/*              hydro_path          ....  pathname to Hydrology Workspace
/*              road_path           ....  pathname to Roads Workspace
/*              rail_path           ....  pathname to Railroads Workspace
/*              misc_path           ....  pathname to Misc Transportation Workspa
/*              potion              ....  Option to be used for CLEAN or BUILDs
/*              failed              ....  set by routine read_dlg_header, this
/*                                        variable is .TRUE. If the routine was
/*                                        unable to read the proper DLG file
/*              dlg_file            ....  Current DLG file name
/*              cover               ....  Coverage name as determined by
/*                                        read_dlg_header. ex H37N076W0
/*              type                ....  First two Characters of coverage type
/*              incoverage          ....  Coverage to be projected
/*              outcoverage         ....  Output projected coverage
/*              tolernc             ....  Coverage Fuzzy Tolerance determined
/*                                        by read_dlg_header
/*              .SE_LAT             ....  The latitude of the southeast corner
/*                                        for the .5 by 1 Quad
/*              .SE_LONG            ....  The longitude of the southeast corner
/*                                        for the .5 by 1 Quad
/*
/* Revision:                         Version 1.1
/*      Added capability to store the four different Coverage
/*      types into different workspaces.  This doubled the
/*      processing speed by storing coverages in different
/*      areas from the conversion area.
/*      Modification to allow automatic detection of DLG file
/*      resolution and specification of processing tolerances.
/*
/* Revision:                         Version 1.2
/*      Made more 'user friendly' and modified messages for
/*      increased.
/*
/* Revision:                         Version 1.3
/*      Changed tolera--e variable to tolernc to try to get the
/*      TOLERANCE command to be recognized.
/*
/* Revision:                         Version 1.4
/*      Added SET PROT step to set the protection on all the coverages
/*      created to allow universal access
/*
/* Revision:                         Version 1.5
/*      Force Hydrology coverages to be built with POLY option.  In
/*      addition if the coverage has polygon topology, it must have
/*      line topology.  All hydrology coverages must have net topology
/*
/* Revision:                         Version 1.6
/*      Removed un-needed code and re-documented.  Changes were made
/*      to ensure non Hydrology coverages were not built with poly opt
/*
/* Revision:                         Version 2.0
/*      Added error handling logic to automate processing further.  Th
/*      program will attempt to run the automated edgematching, fix_jc
/*      and first step processes if possible.  If errors are encounter
/*      they will halt that section of the processing.  For example, i
/*      HYDROLOGY has an edgematching problem, the program will perfor
/*      all the steps for the other feature classes.  Names are obtain
```

```
/*              from the TOPO NAMES data base.
/*
&severity &error &fail
&SETCHAR &SEP '
/* This AML traps all errors that it can handle in the code.
/* If an error is created, No access, Lack of DISK Space etc. We need to
/* fail
/*
&system set prot=(s:rwed,o:rwed,g:rwed,w:rwed)/def /* Start a watch file. If one has not already been activated by the user
&IF [Show &watch] = &OFF &then &do
   &type Activating Watch file DLG_CONVERSION.WAT
   &watch DLG_CONVERSION.WAT
   &end
&else &type Using already activated watch [Show &watch]

&TYPE Automatic DLG Coversion Process    Version 2.0
&type
&type Copywrite 1989 - Teledyne Brown Engineering
&type &IF ^ [VARIABLE .SE_LAT] &THEN &s .se_lat := 999.0
&IF ^ [VARIABLE .SE_LONG] &THEN &s .se_long := 999.0

/* Get name and versions of files to be converted

&do &until [Query 'Yes or No (yes)' .TRUE.]
   &type
   &s base_name := [Response 'Please Enter raw data DLG file']
   &s start_version := [Response 'Starting Version']
   &s end_version := [Response 'Ending Version']
   &type Are these correct?
   &type
   &type Base name        %base_name%
   &type Start version    %start_version%
   &type End version      %end_version%
   &type
   &end /* Get pathnames for distribution of coverages
/* Default Workspaces are the current, call make_path to create those
/* pathnames
make_path # # 0
&s current := %.sys_path%
make_path %current% hydro 1
&s hdef := %.sys_path%
make_path %current% roads 1
&s rdef := %.sys_path%
make_path %current% rails 1
&s tdef := %.sys_path%
make_path %current% misc 1
&s mdef := %.sys_path%

&setchar &function .+ +.
&do &until .+Query 'Yes or No (yes)' .TRUE. +.
   &type
   &type *** OUTPUT PATHNAMES ***
   &do &until .+Exists %hydro_path% -DIR+.
      &s hydro_path := .+Response 'Enter Hydrology Workspace' %hdef%+.
      &end
   &do &until .+Exists %road_path% -DIR+.
      &s road_path := .+Response 'Enter Roads Workspace' %rdef%+.
      &end
   &do &until .+Exists %rail_path% -DIR+.
      &s rail_path := .+Response 'Enter Railroad Workspace' %tdef%+.
      &end
   &do &until .+Exists %misc_path% -DIR+.
      &s misc_path := .+Response 'Enter Misc. Trans Workspace' %mdef%+.
      &end
   &type
   &type Are these correct?
   &type Hydrology path    %hydro_path%
```

```
      &type Road path          %road_path%
      &type Rail path          %rail_path%
      &type Misc. path         %misc_path%
      &type
      &end
&type
&setchar &function [ ]
&type
&type DLG conversion started at [DATE -VFULL]
&type &do &while %start_version% LE %end_version%
   /* Process DLG File Conversion &s potion := POLY
   &call read_dlg_header
   &if  %failed% OR [Exists %cover%a -cover] OR [Exists %cover%p -cover] or
        [Exists %cover%n -cover] &then &do
      &type ERRORERRORERRORERRORERRORERRORERROR
      &type **                                                **
      &type ** ABORTING DLG %dlg_file%
      &if ^ %failed% &then &do
         &type **       Coverage %cover% already converted     **
         &end
      &type                                                 
     .&type ***************** *********************** ******
      &type
      &end
   &else &do
      /* Check existence of temp coverages and Kill em
      &type ********************************************************
      &type **        BEGINNING CONVERSION FOR DLG %start_version%
      &type **              COVERAGE %cover%
      &type ********************************************************
      &if [Exists t$a -COVER] &then KILL t$a ALL
      &if [Exists t$p -cover] &then Kill t$p ALL
      &if [Exists t$n -cover] &then Kill t$n ALL
      &if [Exists t$alb -cover] &then Kill t$alb ALL
      &if [Exists t$calb -cover] &then Kill t$calb ALL
      &if [Exists t$alb2 -cover] &then Kill t$alb2 ALL /* Do Basic Conversion DLGARC optional %dlg_file% t$a t$p t$n
      &type  Coding Coverages /* Check for polygon data
      &if [Exists t$a.pcode -INFO] &then &do
         /* Polygon Topology Exists
         /* USGS Coverages are CLEAN and attributes are in ascending order ε
         /* we can use an ordered relate.  This may not be true for DLGs cre
         /* by other sources
         /*
         /* PATCH TO TRY AND FIX HYDROLOGY CODING PROBLEMS.  MOST PROBLEMS Ι
         /* CAUSED BY POOR LABEL PLACEMENT AND EXTRANEOUS LABELS BEING CREAT
         /* BY DLGARC
         /*
         &DATA ARC INFO
ARC
SEL T$A.PCODE
RESEL FOR MAJOR1 GE 50
NSEL
OUTPUT BAD.LST INIT
PRINT T$A-ID
STOP STOP
&END
         &S UNIT := [OPEN [.INFO]BAD.LST STAT -READ]
         &S LINE := [READ %UNIT% STAT]
         &IF %STAT% = 0 &THEN &DO
            ARCEDIT
            EDITCOV T$A
            EDITF LABEL
            SEL ALL
```

```
            NSEL
            &DO &WHILE %STAT% = 0
                ASEL $ID EQ [UNQUOTE %LINE%]
                &S LINE := [READ %UNIT% STAT]
                &END
            DELETE
            SAVE
            QUIT
            &END
        &S STAT := [CLOSE %UNIT%]
        /* END OF PATCHES
            BUILD t$a POLY          T$A.PCODE                    -ID- /001,/
            JOINITEM T$A.PAT T$A.PCODE T$A.PAT T$A-ID T$A-. ORDERED
            &s potion := POLY
            &end
        &ELSE &s POTION := LINE /* Check for line data
        &if [Exists t$a.acode -INFO] &then &do
            /* line Topology Exists */
            BUILD T$a Line
            JOINITEM T$A.AAT T$A.ACODE T$A.AAT T$A-ID T$A-ID ORDERED
            &end /* Check for point data (Degenerate lines)
        &if [Exists t$p.xcode -INFO] &then &do
            /* Point Topology Exists */
            BUILD T$p POint
            JOINITEM T$P.PAT T$P.XCODE T$P.PAT T$P-ID T$P-ID ORDERED
            &end
        &else kill t$p
/* Check for node (point) data
        &if [Exists t$n.ncode -INFO] &then &do
            /* Node Topology Exists */
            BUILD T$n POINT
            JOINITEM T$N.PAT T$N.NCODE T$N.PAT T$N-ID T$N-ID ORDERED
            &end
        &else kill t$n /* If there are no codes for the arc coverage, we dont need it so
/* kill it
        &if ^ [Exist t$a.pcode -INFO] & ^ [Exist t$a.acode -INFO] &then &do
            kill t$a
            &end /*   CLEAN up by removing .ACODE .PCODE .XCODE and .NCODE in INFO
        &if %type% eq HY AND [Exists t$a -cover] &then &do
            &s potion := POLY
            &if ^ [Exists t$a -poly] &then build t$a poly
            &if ^ [Exists t$a -line] &then &do
                /* This is a very special case.  We have polygons but no lines.
                /* This is normal for large lakes or seas.  In this case we have
                /* to build the line topology and code it with a MAJOR1 MINOR1.
                /* these arcs are then coded -9999 for border arcs.
                build t$a line
                ADDITEM T$A.AAT T$A.AAT MAJOR1 6 6 I
                ADDITEM T$A.AAT T$A.AAT MINOR1 6 6 I
                &data ARC INFO
ARC
SEL T$A.AAT
CALC MAJOR1 = -9999
CALC MINOR1 = -9999
STOP STOP
            &end
            &end
        &end
        &data ARC INFO
ARC
        &if [Exists T$A.ACODE -INFO] &then &do
SEL T$A.ACODE
DELETE T$A.ACODE
        &end
        &if [Exists T$A.PCODE -INFO] &then &do
```

```
SEL T$A.PCODE
DELETE T$A.PCODE
Y
        &end
     &if [Exists T$P.XCODE -INFO] &then &do
SEL T$P.XCODE
DELETE T$P.XCODE
Y
        &end
     &if [Exists T$N.NCODE -INFO] &then &do
SEL T$N.NCODE
DELETE T$N.NCODE
Y
        &end
STOP STOP
        &end
/* END OF INFO SESSION &if [Exists T$A -cover] &then &do
         &s incoverage := T$A
         &s outcoverage := T$ALB
         &call project_coverage
         &end &if [Exists T$P -cover] &then &do
         &s incoverage := T$P
         &s outcoverage := %cover%P
         &call project_coverage
         &end &if [Exists T$N -cover] &then &do
         &s incoverage := T$N
         &s outcoverage := %cover%N
         &call project_coverage
         &end /* We have to re-build a polygon coverage after projecting it.
      &If [Exists T$ALB -COVER] &then &do
         BUILD T$ALB %potion%
         COPY T$ALB %cover%A
         TOLERANCE %cover%A FUZZY %tolernc%
         &end
/* Set Tolerances for coverage.
      &end
      &type [date -vfull]
    &s start_version := %start_version% + 1
    &end
/*
/* Here is where we start the execution of the auto-edge and optionally othe
/* procedures.  Any error at this point is FATAL and we would never have mac
/* it here.
&type
&type DLG conversion completed at [DATE -VFULL]
&type
&type Watch file [show &watch] still active ...
&return
&routine read_dlg_header
/*
/* This routine opens the appropriate DLG file and obtains the
/* information necessary to name the coverage, utm zone for
/* projection, Tolerences , and coverage type.
/*
/*    Variables:
/*             base_name      .... Dlg pathname not including version num
/*             start_version  .... First DLG file to process
/*             failed         .... set by routine read_dlg_header, this
/*                                 variable is .TRUE. if the routine was
/*                                 unable to read the proper DLG file
/*             dlg_file       .... Current DLG file name
/*             cover          .... Coverage name
/*             unit           .... DLG file unit
/*             line           .... Is used to read in each line
/*                                 from DLG file
```

```
/*               i                 .... Temporary counter
/*               utm_zone          .... UTM zone for DLG file projection
/*               lat               .... latitude of se corner
/*               long              .... longitude of se corner
/*               type              .... First two Characters of coverage type
/*               hydro_path        .... pathname to Hydrology Workspace
/*               road_path         .... pathname to Roads Workspace
/*               rail_path         .... pathname to Railroads Workspace
/*               misc_path         .... pathname to Misc Transportation Workspa
/*
&SEVERITY &ERROR &FAIL &s failed := .FALSE.
&s dlg_file := %base_name%;%start_version%
&if ^ [Exists %dlg_file% -FILE] &then &do
    &type ABORTING CONVERSION OF %dlg_file%    UNABLE TO OPEN INPUT FILE
    &s failed := .TRUE.
    &return
    &end &s unit := [Open %dlg_file% stat -read]
&s line := [Read %unit% stat]
&s line := [Read %unit% stat]

/* line 2 has resolution
&s tolernc := [Trim [Substr %line% 53 8] -both ' ']
&select %tolernc%
   &when 100000
      &s tolernc := 12.5
   &when 24000
      &s tolernc := 3
   &when 2000000
      &s tolernc := 500
   &otherwise
      &do
      &type Unknown tolerance %tolernc%
      &type setting to default value for 100,000 data
      &s tolernc := 12.5
      &end
   &end &do I := 1 &TO 2
   &s line := [Read %unit% stat]
   &end /* line 4 has the zone
&s utm_zone := [Trim [Substr %line% 13 6] -both ' ']

&do I := 1 &TO 10
   &s line := [Read %unit% stat]
   &end

&if %stat% ne 0 &then &do
   &type error in DLG file format
   &s cover := ERROR
   &s failed := .TRUE.
   &return
   &end /* Line 14 has the SE corner
&s t$lat := [abs [unquote [substr %line% 9 8]]]
&s t$long := [abs [unquote [substr %line% 21 8]]]
&if %t$lat% < %.se_lat% &then &s .se_lat := %t$lat%
&if %t$long% < %.se_long% &then &s .se_long := %t$long%
&s long := [Translate [Trim [Substr %line% 21 5] -both ' '] W .]
&s long := [Trim %long% -both -]
&s lat := [Translate [Trim [Substr %line% 9 5] -both ' '] N .]

&s line := [Read %unit% stat]

/* Line 15 has the coverage type
&s type := [Substr %line% 1 2]
&Select %type%
```

```
        &when HY
            &do
            make_path %hydro_path% h%lat%%long% 2
            &s cover := %.sys_path%
            &end
        &when RO
            &do
            make_path %road_path% r%lat%%long% 2
            &s cover := %.sys_path%
            &end
        &when RA
            &do
            make_path %rail_path% t%lat%%long% 2
            &s cover := %.sys_path%
            &end
        &when PI
            &do
            make_path %misc_path% m%lat%%long% 2
            &s cover := %.sys_path%
            &end
        &otherwise
            &do
            &type unknown Coverage Type
            &type %line%
            &type
            &type Saving Locally using X prefix
            &s cover := X%lat%%long%
            &end
        &end
&s stat := [Close %unit%]
&return &routine project_coverage
/*
/* This is the routine called to project coverages from there utm projection
/* to the users base projection system.  The USSDC GIS uses an ALBERS
/* projection as data is aquired CONUS wide.
/*
/* For users who do not require any projection changes, simply have this
/* routine copy incoverage to outcoverage and return.
/*
/* The variables used to pass parameters are:
/*
/*
/*    Variables:
/*                incoverage      .... Coverage to project
/*                outcoverage     .... Output coverage name
/*                utm_zone        .... Utm Zone of incoverage
/*
PROJECT COVER %incoverage% %outcoverage%
[unquote INPUT]
[unquote 'PROJECTION UTM']
[unquote 'ZONE '%utm_zone%]
[unquote 'UNITS METERS']
[unquote 'PARAMETERS']
/* Output Projection Parameters
[unquote 'OUTPUT']
[unquote 'PROJECTION ALBERS']
[unquote 'UNITS METERS']
[unquote 'PARAMETERS']
[unquote '29 30 00']
[unquote '45 30 00']
[unquote '-96 00 00']
[unquote '23 00 00']
[unquote '0.0']
[unquote '0.0']
[unquote 'END']
&return
        PROGRAM DLGLINK
        IMPLICIT NONE
C
C   DLGLINK    Version 1.0    TELEDYNE BROWN ENGINEERING
```

```
C
C
C
C                       COPYWRITE 1989- TELEDYNE BROWN ENGINEERING
C
C
C
C   Purpose:  This program replaces the autolink command for ARCEDIT and
C             creates LINKS for DLG coverages.  The program is very specific
C             to standard USGS DLG coverages.  Its purpose is to automate the
C             edgematching process whenever possible.  The autolink command
C             arcedit makes too many mistakes in calculating links and
C             therefore requires a user to verify the generated links.  This
C             program takes advantage of the fact that DLG coverages have ec
C             or border arcs coded -9999.  This elimates huge numbers of nod
C             from consideration during AUTOLINK.
C
C             Additionally we can guarantee that only one node is allowed to
C             snap to a match nodes.  If all the nodes along the snapcover
C             have a link, then the edge has been automatically edged.  If
C             all edges have links generated correctly, then the cover can
C             be adjusted without user intervention.
C             If one edge fails the criteria, the cover is listed in an erro
C             file so that it can be verified manually later.  The following
C             the criteria used to generate links.
C
C             1.  Use only nodes that belong to arcs coded -9999, this ensur
C                 we dont collapse features.
C
C             2.  Only use the one edge of the snapcover.  This can be
C                 determined because all coverages are quadrangular.  This
C                 reduces search time and is the only way we can verify all
C                 links are present.
C
C             3.  Link are added based on the snapcover edge to the closest
C                 node of the EDITCOVERGE.  The link must be less than or
C                 equal to the SNAP distance.
C
C             4.  Only one LINK is allowed to a single snapcover node.
C
C             5.  If all snapcover nodes are linked,  the edge is linked
C
C             6.  If all edges are correctly linked, the cover is linked.
C
C          To Log the failure of an autoedge, we create a file DLGLINK.LOG
C          Each entry in this file requires edgematching
C
C                               Version 1.1
C
C        Change:
C                 Code modified to test if node causing a fatal link error
C                 is a pseudo-node.  If its a pseudo-node then we really
C                 dont have a problem.
C
C                               Version 1.2
C
C        Change:            algorithm to
C                 Change sort algorithm to a Shell-Metzer sort.
C
        INTEGER*4 IS_PSEUDO
        INTEGER*4 ECOUNT,WCOUNT,NCOUNT,SCOUNT
        STRUCTURE /STRUC3/
        REAL*4 X
        REAL*4 Y
        END STRUCTURE
        INTEGER*2 ARC_MAX
        PARAMETER (ARC_MAX=1000)
        RECORD /STRUC3/ TEMP
        RECORD /STRUC3/ EAST(ARC_MAX)
        RECORD /STRUC3/ WEST(ARC_MAX)
        RECORD /STRUC3/ NORTH(ARC_MAX)
        RECORD /STRUC3/ SOUTH(ARC_MAX)
        COMMON /COVS/ EAST,WEST,NORTH,SOUTH,ECOUNT,WCOUNT,NCOUNT,
     X                SCOUNT
```

```
      INTEGER*4 EDITCNT
      RECORD /STRUC3/ EDITND(ARC_MAX)
      COMMON /EDCOV/ EDITND,EDITCNT
C
      STRUCTURE /STRUC4/
      REAL*4 X1
      REAL*4 Y1
      REAL*4 X2
      REAL*4 Y2
      END STRUCTURE
      RECORD /STRUC4/ LINK
C
      CHARACTER*128 EDITCOV,NCOV,ECOV,WCOV,SCOV,LINK_PATH,ERROR_PATH
      CHARACTER*128 AUX_PATH
      INTEGER*4 I,T,LAST,LINK_CHANNEL,TYPE,IRECL,ERROR_CHANNEL
      INTEGER*4 IERR,EDITPT,IREC,AUX_CHANNEL
      REAL*4 X,Y,EDIT_DIST
      LOGICAL*4 SORTED,EXST,BADEDGE,MATCH
      INTEGER*4 ILEN,IVAL,IOP,ICNT,K,IS
      REAL*8 RVAL
      CHARACTER*128 IBUFF
C
C BEGIN DLGLINK
C
C Initialize ARC/INFO subsystems
C
      CALL TTINIT
      CALL LUNINI
      CALL AMLINI
      CALL VINIT
      CALL GETINT
      CALL MINIT
      CALL MESINI
C
C GET PARAMETERS
C
      CALL MESIAM('DLGLINK')
      CALL INFORM('AUTO LINK VERSION 1.2',-1)

CALL INFORM('Copywrite 1989 Teledyne Brown Engineering',-1)
      CALL AMLTTY
      CALL RDLINE(EDITCOV,MATCH)
      CALL RDLINE(ECOV,MATCH)
      CALL RDLINE(WCOV,MATCH)
      CALL RDLINE(NCOV,MATCH)
      CALL RDLINE(SCOV,MATCH)
      CALL LINTRP(0,IOP,IBUFF,ILEN,IVAL,RVAL)
      EDIT_DIST=RVAL
      CALL MESRL(EDIT_DIST,3)
      CALL INFORM('Snapping Distance set to %1% ',-1)
C
C Name the Error file and the output aml
C
      AUX_PATH='BADLINKS.LOG'
      ERROR_PATH='DLGLINK.LOG'
      LINK_PATH='ADD_LINKS.AML'
      AUX_CHANNEL = -1
      CALL PROC_COV(EDITCOV)
C
C for the editcoverage we take all the nodes, place them in EDITND and SORT
C in order by X,Y
C
      T=1
      DO WHILE(T.LE.WCOUNT)
         EDITND(T).X=WEST(T).X
         EDITND(T).Y=WEST(T).Y
         T=T+1
         END DO
      I=T
      T=1
      DO WHILE(T.LE.SCOUNT)
         EDITND(I).X=SOUTH(T).X
         EDITND(I).Y=SOUTH(T).Y
```

```
              T=T+1
              I=I+1
              END DO
           T=1
           DO WHILE(T.LE.NCOUNT)
              EDITND(I).X=NORTH(T).X
              EDITND(I).Y=NORTH(T).Y
              T=T+1
              I=I+1
              END DO
           T=1
           DO WHILE(T.LE.ECOUNT)
              EDITND(I).X=EAST(T).X
              EDITND(I).Y=EAST(T).Y
              T=T+1
              I=I+1
              END DO
           EDITCNT=I-1
C
C Lets Sort EDITND, there are EDITCNT entries. Use Shell-Metzer sort.
C
           IS=EDITCNT
           IS=INT(FLOAT(IS)/2.0)
           DO WHILE(IS.GE.1)
              DO 50 K=1,IS
                 LAST= EDITCNT-IS
                 DO 60 I=K,LAST,IS
                    T=I
                    TEMP.X=EDITND(I+IS).X
                    TEMP.Y=EDITND(I+IS).Y
40                  IF (TEMP.X.GE.EDITND(T).X) GOTO 48
                    EDITND(T+IS).X=EDITND(T).X
                    EDITND(T+IS).Y=EDITND(T).Y
                    T=T-IS
                    IF(T.GE.1) GOTO 40
48                  EDITND(T+IS).X=TEMP.X
                    EDITND(T+IS).Y=TEMP.Y
60               CONTINUE
50            CONTINUE
              IS=INT(FLOAT(IS)/2.0)
           END DO
C
C THERE SORTED
C
C Lets process each edge, IF cov is NONE there is not an edge
C
           BADEDGE=.FALSE.
C
C lets get a Link path open
C  the link file is an aml which has the commands to add the links
C  to the coverage and optionally adjust and save it.
C
           CALL ACREAT(LINK_CHANNEL,LINK_PATH,IERR)
           IF(IERR.NE.0) THEN
              CALL FATAL('UNABLE TO CREATE LINK FILE',-1)
              ENDIF
C
C Write commands to enter arcedit, set editfeature, editcover
C                   coordinate keyboard, and add
           WRITE(LINK_CHANNEL,100)
           WRITE(LINK_CHANNEL,101) EDITCOV
           WRITE(LINK_CHANNEL,102)
           WRITE(LINK_CHANNEL,103)
100        FORMAT('ARCEDIT',/,'COORDINATE KEYBOARD')
101        FORMAT('EDITCOV ',A128)
102        FORMAT('EDITF LINK')
103        FORMAT('ADD')
104        FORMAT('1,',F14.4,',',F14.4)
222        FORMAT(1X,A12)
223        FORMAT(1X,A6,' Edge. Location ',F14.2,',',F14.2)
C
C  To process a cover we read in all the necessary nodes for the snapcover
C  sorting them into there NORTH SOUTH EAST and WEST edges.  If we are
```

```
C     linking to the East cover, its west edge is matched upto.  Matching is
C     done by processing through each node of the snapcover.  The location
C     of the node is then compared to the editcover nodes and the closest
C     node is returned.  Once the match is found the ASCII command to add the
C     link is written to the output AML.  Later this aml is executed to
C     add the links in ARCEDIT.
C
      IF(ECOV.NE.'NONE') THEN
C         We match to the west edge of the ECOV
          CALL PROC_COV(ECOV)
          I=1
          DO WHILE(I.LE.WCOUNT)
              CALL FIND_CLOSEST(WEST(I).X,EDITPT,EDIT_DIST,MATCH)
              IF(MATCH) THEN
                  WRITE(LINK_CHANNEL,104) EDITND(EDITPT).X,
     X                                    EDITND(EDITPT).Y
                  WRITE(LINK_CHANNEL,104) WEST(I).X,WEST(I).Y
              ELSE
C
C We may have an error, If there is no node in 5 times the editdist this
C is a simple pseudo in the border arc
C
                  X=EDIT_DIST*5.0
                  CALL FIND_CLOSEST(WEST(I).X,EDITPT,X,MATCH)
                  IF (MATCH) THEN
C
C CHECK IF THIS IS A PSEUDO-NODE .....
C
                      ICNT=IS_PSEUDO(ECOV,WEST(I).X,WEST(I).Y)
                      IF(ICNT.EQ.2) THEN
                          WRITE(LINK_CHANNEL,120) WEST(I).X,WEST(I).Y
120   FORMAT ('&TYPE Location ',F14.4,',',F14.4,' is a pseudo node')
                      ELSE
C We have a fatal LINK error, we log the coordinates of all failures to
C the aux_channel, this eases the correcting process
C
C we have a badedge lets log the failure
C
                          IF (AUX_CHANNEL.LT.0) THEN
                              CALL AEXIST(AUX_PATH,IERR)
                              IF(IERR.EQ.0) THEN
                                  CALL AAPPEN(AUX_CHANNEL,AUX_PATH,IERR)
                              ELSE
                                  CALL ACREAT(AUX_CHANNEL,AUX_PATH,IERR)
                              ENDIF
                              WRITE(AUX_CHANNEL,222) EDITCOV
                          ENDIF
                          WRITE(AUX_CHANNEL,223)
     X                        'EAST   ',WEST(I).X,WEST(I).Y
                          CALL MESRL(WEST(I).X,1)
                          CALL MESRL(WEST(I).Y,1)
          CALL INFORM('Fatal Link Error at location %1% , %2%',-1)
                          BADEDGE=.TRUE.
                      ENDIF
                  ENDIF
              ENDIF
              I=I+1
          END DO
      ENDIF
C
      IF(WCOV.NE.'NONE') THEN
C         We match to the EAst edge of the WCOV
          CALL PROC_COV(WCOV)
          I=1
          DO WHILE(I.LE.ECOUNT)
              CALL FIND_CLOSEST(EAST(I).X,EDITPT,EDIT_DIST,MATCH)
              IF(MATCH) THEN
                  WRITE(LINK_CHANNEL,104) EDITND(EDITPT).X,
     X                                    EDITND(EDITPT).Y
                  WRITE(LINK_CHANNEL,104) EAST(I).X,EAST(I).Y
              ELSE
C
C We may have an error, If there is no node in 5 times the editdist
```

```
C is a simple pseudo in the border arc
C
                  X=EDIT_DIST*5.0
                  CALL FIND_CLOSEST(EAST(I).X,EDITPT,X,MATCH)
                  IF (MATCH) THEN
C
C CHECK IF THIS IS A PSEUDO-NODE .....
C
                      ICNT=IS_PSEUDO(WCOV,EAST(I).X,EAST(I).Y)
                      IF(ICNT.EQ.2) THEN
                         WRITE(LINK_CHANNEL,120) EAST(I).X,EAST(I).Y
                      ELSE
C We have a fatal LINK error, we log the coordinates of all failures to
C the aux_channel, this eases the correcting process .
C
C we have a badedge lets log the failure
C
                      IF (AUX_CHANNEL.LT.0) THEN
                         CALL AEXIST(AUX_PATH,IERR)
                         IF(IERR.EQ.0) THEN
                            CALL AAPPEN(AUX_CHANNEL,AUX_PATH,IERR)
                         ELSE
                            CALL ACREAT(AUX_CHANNEL,AUX_PATH,IERR)
                         ENDIF
                         WRITE(AUX_CHANNEL,222) EDITCOV
                      ENDIF
                      WRITE(AUX_CHANNEL,223)
     X                   'WEST ',EAST(I).X,EAST(I).Y
                      CALL MESRL(EAST(I).X,1)
                      CALL MESRL(EAST(I).Y,1)
      CALL INFORM('Fatal Link Error at location %1% %2%',-1)
                      BADEDGE=.TRUE.
                      ENDIF
                  ENDIF
              I=I+1
              END DO
          ENDIF
C
       IF(SCOV.NE.'NONE') THEN
C          We match to the NORTH edge of the SCOV
           CALL PROC_COV(SCOV)
           I=1
           DO WHILE(I.LE.NCOUNT)
              CALL FIND_CLOSEST(NORTH(I).X,EDITPT,EDIT_DIST,MATCH)
              IF(MATCH) THEN
                 WRITE(LINK_CHANNEL,104) EDITND(EDITPT).X,
     X                                   EDITND(EDITPT).Y
                 WRITE(LINK_CHANNEL,104) NORTH(I).X,NORTH(I).Y
              ELSE
C
C We may have an error, If there is no node in 5 times the editdist this
C is a simple pseudo in the border arc
C
                  X=EDIT_DIST*5.0
                  CALL FIND_CLOSEST(NORTH(I).X,EDITPT,X,MATCH)
                  IF (MATCH) THEN
C
C CHECK IF THIS IS A PSEUDO-NODE .....
C
                      ICNT=IS_PSEUDO(SCOV,NORTH(I).X,NORTH(I).Y)
                      IF(ICNT.EQ.2) THEN
                         WRITE(LINK_CHANNEL,120) NORTH(I).X,NORTH(I).Y
                      ELSE
C We have a fatal LINK error, we log the coordinates of all failures to
C the aux_channel, this eases the correcting process
C
C we have a badedge lets log the failure
C
                      IF (AUX_CHANNEL.LT.0) THEN
                         CALL AEXIST(AUX_PATH,IERR)
                         IF(IERR.EQ.0) THEN
```

```
                        CALL AAPPEN(AUX_CHANNEL,AUX_PATH,IERR)
                    ELSE
                        CALL ACREAT(AUX_CHANNEL,AUX_PATH,IERR)
                    ENDIF
                    WRITE(AUX_CHANNEL,222) EDITCOV
                    ENDIF
                    WRITE(AUX_CHANNEL,223)
     X                  'SOUTH ',NORTH(I).X,NORTH(I).Y
                    CALL MESRL(NORTH(I).X,1)
                    CALL MESRL(NORTH(I).Y,1)
     CALL INFORM('Fatal Link Error at location %1% , %2%',-1)
                    BADEDGE=.TRUE.
                    ENDIF
                ENDIF
            ENDIF
            I=I+1
            END DO
        ENDIF
C
        IF(NCOV.NE.'NONE') THEN
C           We match to the SOUTH edge of the NCOV
            CALL PROC_COV(NCOV)
            I=1
            DO WHILE(I.LE.SCOUNT)
                CALL FIND_CLOSEST(SOUTH(I).X,EDITPT,EDIT_DIST,MATCH)
                IF(MATCH) THEN
                    WRITE(LINK_CHANNEL,104) EDITND(EDITPT).X,
     X                                       EDITND(EDITPT).Y
                    WRITE(LINK_CHANNEL,104) SOUTH(I).X,SOUTH(I).Y
                ELSE
C
C We may have an error, If there is no node in 5 times the editdist this
C is a simple pseudo in the border arc
C
                    X=EDIT_DIST*5.0
                    CALL FIND_CLOSEST(SOUTH(I).X,EDITPT,X,MATCH)
                    IF (MATCH) THEN
C
C CHECK IF THIS IS A PSEUDO-NODE .....
C
                        ICNT=IS_PSEUDO(NCOV,SOUTH(I).X,SOUTH(I).Y)
                        IF(ICNT.EQ.2) THEN
                            WRITE(LINK_CHANNEL,120) SOUTH(I).X,SOUTH(I).Y
                        ELSE
C We have a fatal LINK error, we log the coordinates of all failures to
C the aux_channel, this eases the correcting process
C
C we have a badedge lets log the failure
C
                        IF (AUX_CHANNEL.LT.0) THEN
                            CALL AEXIST(AUX_PATH,IERR)
                            IF(IERR.EQ.0) THEN
                                CALL AAPPEN(AUX_CHANNEL,AUX_PATH,IERR)
                            ELSE
                                CALL ACREAT(AUX_CHANNEL,AUX_PATH,IERR)
                            ENDIF
                            WRITE(AUX_CHANNEL,222) EDITCOV
                        ENDIF
                        WRITE(AUX_CHANNEL,223)
     X                      'NORTH ',SOUTH(I).X,SOUTH(I).Y
                        CALL MESRL(SOUTH(I).X,1)
                        CALL MESRL(SOUTH(I).Y,1)
     CALL INFORM('Fatal Link Error at location %1% , %2%',-1)
                        BADEDGE=.TRUE.
                        ENDIF
                    ENDIF
                ENDIF
            I=I+1
            END DO
        ENDIF
C
C CLOSE LINK_CHANNEL
C
```

```
            WRITE(LINK_CHANNEL,105)
105         FORMAT('9')
            IF(.NOT.BADEDGE) THEN
                WRITE(LINK_CHANNEL,106)
106             FORMAT('ADJUST',/,'SEL ALL',/,'DELETE')
            ELSE
C
C we have a badedge lets log the failure
C
            CALL AEXIST(ERROR_PATH,IERR)
            IF(IERR.EQ.0) THEN
                CALL AAPPEN(ERROR_CHANNEL,ERROR_PATH,IERR)
            ELSE
                CALL ACREAT(ERROR_CHANNEL,ERROR_PATH,IERR)
                ENDIF
            WRITE(ERROR_CHANNEL,108) EDITCOV
108         FORMAT(A128)
            CALL ACLOSE(AUX_CHANNEL)
            CALL ACLOSE(ERROR_CHANNEL)
            END IF
            WRITE(LINK_CHANNEL,107)
107         FORMAT('SAVE',/,'QUIT')
            CALL ACLOSE (LINK_CHANNEL)
            ERROR_PATH='[]FATAL.ERR.1'
            CALL ADELET(ERROR_PATH,IERR)
            END
C
            SUBROUTINE PROC_COV(COVER_PATH)
C
C    PROC_COV   Version 1.0        TELEDYNE BROWN ENGINEERING
C                                  U.S ARMY STRATEGIC DEFENCE COMMAND
C
C
C
C
C    Purpose:  This subroutine reads in the node tables for the supplied
C              coverage.  The output is passed in the commons for NORTH
C              SOUTH EAST and WEST node tables.  Only nodes for the -9999 arc
            INTEGER*4 FROM_NODE
            INTEGER*4 TO_NODE
            INTEGER*4 LPOLY
            INTEGER*4 RPOLY
            INTEGER*4 NUM_POINTS
            RECORD /STRUC1/ POINTS(500)
            END STRUCTURE
            RECORD /STRUC4/ ARC_STRUCTURE
            COMMON /ASTR/ ARC_STRUCTURE,RECORD_NUMBER,
     X                    IN_CHANNEL
            REAL*4 BND(4)
C
C Get pathnames for coverage and to ARC file
C
            CALL ANAME(COVER_PATH,FULL_PATH,0)
            CALL ANAME(COVER_PATH,ARC_PATH,1)
C
C Open Line Attribute file for reading, we need the MINOR1 code
C
            CALL GETOPN(ITEM_CHANNEL,FULL_PATH,2,'MINOR1',' ',' ',
     X                  IERR)
            IF (IERR.NE.0) THEN
                CALL FATAL('UNABLE TO ACCESS INFO ITEM',-1)
                ENDIF
C
C    ALL VERIFIED .... START MAIN PROCESS
C
C    Open the Arc file for when we need to read it.
C
            CALL VOPEN(IN_CHANNEL,ARC_PATH,TYPE,1,2,IRECL,IERR)
            IF(IERR.NE.0) THEN
                CALL FATAL('UNABLE TO OPEN ARC FILE FOR READING',-1)
                ENDIF
C Prepare to read through the attribute file. If we find a edge arc, record
C nodes in proper north/south table or east/west table.
C
```

```
          RECORD_NUMBER = 1
          EW_COUNT=0
          NS_COUNT=0
          CALL GETVAL(ITEM_CHANNEL,RECORD_NUMBER,MINOR1,IERR)
          DO WHILE(IERR.EQ.0)
             IF (MINOR1.LT.0) THEN
                CALL VREADR(IN_CHANNEL,RECORD_NUMBER,
     X                       ARC_STRUCTURE.USER_ID,LBUFF,IERR)
C            Now lets determine slope of ARC, if it is from -45 to 45
C            it is NORTH/SOUTH, otherwise it is EAST/WEST
C
                DELTAX = ARC_STRUCTURE.POINTS(1).X -
     X                   ARC_STRUCTURE.POINTS(ARC_STRUCTURE.NUM_POINTS).X
                DELTAY = ARC_STRUCTURE.POINTS(1).Y -
     X                   ARC_STRUCTURE.POINTS(ARC_STRUCTURE.NUM_POINTS).Y
                IF(DELTAX.EQ.0.0) THEN
                   SLOPE=90.0
                ELSE
                   SLOPE=ATAND(DELTAY/DELTAX)
                ENDIF
                IF (SLOPE.GT.-45.0.AND.SLOPE.LT.45) THEN
                   NS_COUNT=NS_COUNT+1
                   NS(NS_COUNT).X=ARC_STRUCTURE.POINTS(1).X
                   NS(NS_COUNT).Y=ARC_STRUCTURE.POINTS(1).Y
                   NS_COUNT=NS_COUNT+1
                   IF (NS_COUNT.GE.ARC_MAX)
     X                CALL FATAL ('1000 Border node limit exceeded')
                   NS(NS_COUNT).X=
     X                ARC_STRUCTURE.POINTS(ARC_STRUCTURE.NUM_POINTS).X
                   NS(NS_COUNT).Y=
     X                ARC_STRUCTURE.POINTS(ARC_STRUCTURE.NUM_POINTS).Y
                ELSE
                   EW_COUNT=EW_COUNT+1
                   EW(EW_COUNT).X=ARC_STRUCTURE.POINTS(1).X
                   EW(EW_COUNT).Y=ARC_STRUCTURE.POINTS(1).Y
                   EW_COUNT=EW_COUNT+1
                   IF (EW_COUNT.GE.ARC_MAX)
     X                CALL FATAL ('1000 Border node limit exceeded')
                   EW(EW_COUNT).X=
     X                ARC_STRUCTURE.POINTS(ARC_STRUCTURE.NUM_POINTS).X
                   EW(EW_COUNT).Y=
     X                ARC_STRUCTURE.POINTS(ARC_STRUCTURE.NUM_POINTS).Y
                ENDIF
             ENDIF
             RECORD_NUMBER=RECORD_NUMBER+1
             CALL GETVAL(ITEM_CHANNEL,RECORD_NUMBER,MINOR1,IERR)
          END DO
          CALL VCLOSE(IN_CHANNEL)
          CALL GETCLS(ITEM_CHANNEL)
C
C Now lets separate into individual North/South/East/West tables
C
          ECOUNT=0
          WCOUNT=0
          SCOUNT=0
          NCOUNT=0
C
C Find mid_X and Mid_Y
C
C LEAST AND MAX
C
          CALL BOXGET(COVER_PATH,BND,IERR)
          MID_X=(BND(1)+BND(3))/2.0
          MID_Y=(BND(2)+BND(4))/2.0
C
C Now we have the mid-points we can separate into North South East West
C
          DO 30 I=1,EW_COUNT
             IF (EW(I).X.GT.MID_X) THEN
                ECOUNT=ECOUNT+1
                EAST(ECOUNT).X=EW(I).X
                EAST(ECOUNT).Y=EW(I).Y
             ELSE
                WCOUNT=WCOUNT+1
                WEST(WCOUNT).X=EW(I).X
```

```
              WEST(WCOUNT).Y=EW(I).Y
           ENDIF
30      CONTINUE
C
C Find North and South
C
        DO 40 I=1,NS_COUNT
           IF (NS(I).Y.GT.MID_Y) THEN
              NCOUNT=NCOUNT+1
C            are read in.  The following is a summary algorithm book.
C .
C   1: Open and read through the attribute file,  If the arc is coded
C      less than 0 it is a border arc
C
C   2: Read in the corresponding arcs and record the nodes.  If the slope
C      of the line between the nodes is between -45 and 45 degrees the
C      nodes belong to either the north or south edges and are saved in
C      NS_table : otherwise the arc is on the east or west edge and is
C      recorded in the EW_table.
C
C   3: The next step separates the two tables into the four cardinal
C      direction edges.  This is done by finding the midpoint and saying
C      all points above that point are NORTH all below SOUTH etc.
C
C  Declare structures and commons.  Commons are required because
C  FORTRAN does not honor the normal rules of scope for internal
C  subroutines.
C
        INTEGER*4 I,T,ITEM_CHANNEL
        INTEGER*4 LBUFF,TYPE,IRECL,IERR
        CHARACTER*128 COVER_PATH,ARC_PATH,FULL_PATH
        REAL*4 MINOR1,SLOPE,DELTAX,DELTAY,LEAST,MAX,MID_X,MID_Y
        REAL*4 X,Y
        LOGICAL*4 EXST
C
C Node table common,  this table is used to gather the nodes that are
C EAST/WEST, NORTH/SOUTH oriented.  Once this group is collected the
C data is moved to four separate tables for EAST, WEST, NORTH and SOUTH
C edges.
C
C
        INTEGER*4 ECOUNT,WCOUNT,NCOUNT,SCOUNT
        STRUCTURE /STRUC3/
        REAL*4 X
        REAL*4 Y
        END STRUCTURE
        INTEGER*2 ARC_MAX
        PARAMETER (ARC_MAX=1000)
        RECORD /STRUC3/ EAST(ARC_MAX)
        RECORD /STRUC3/ WEST(ARC_MAX)
        RECORD /STRUC3/ NORTH(ARC_MAX)
        RECORD /STRUC3/ SOUTH(ARC_MAX)
        COMMON /COVS/ EAST,WEST,NORTH,SOUTH,ECOUNT,WCOUNT,NCOUNT,
     X                SCOUNT
C
        INTEGER*4 EW_COUNT,NS_COUNT
        STRUCTURE /STRUC1/
        REAL*4 X
        REAL*4 Y
        END STRUCTURE
        RECORD /STRUC1/ EW(ARC_MAX)
        RECORD /STRUC1/ NS(ARC_MAX)
C
C Arc structure,  This structure is used to store the arcs that are
C read.
C
        INTEGER*4 RECORD_NUMBER,IN_CHANNEL
        STRUCTURE /STRUC4/
        INTEGER*4 USER_ID
              NORTH(NCOUNT).X=NS(I).X
              NORTH(NCOUNT).Y=NS(I).Y
           ELSE
              SCOUNT=SCOUNT+1
              SOUTH(SCOUNT).X=NS(I).X
```

```
                SOUTH(SCOUNT).Y=NS(I).Y
             ENDIF
40          CONTINUE
C
C ALL SEPARATED
C
C Because we recorded both the from node and tnode, we need to eliminate
C those nodes which are duplicated.
C
C
C Pickup current node as Good x,y .... If we find a duplicate we take
C the last node and place it at the current location.  Then decrement
C the node count by 1 and continue. We do not need to check the moved
C node as their can only be one duplicate
C
         I=1
         DO WHILE (I.LT.ECOUNT)
            X=EAST(I).X
            Y=EAST(I).Y
            T=I+1
            DO WHILE(T.LE.ECOUNT)
               IF (EAST(T).Y.EQ.Y) THEN
                  EAST(T).X=EAST(ECOUNT).X
                  EAST(T).Y=EAST(ECOUNT).Y
                  T=ECOUNT
                  ECOUNT=ECOUNT-1
               ENDIF
               T=T+1
            END DO
            I=I+1
         END DO
C
         I=1
         DO WHILE (I.LT.WCOUNT)
            X=WEST(I).X
            Y=WEST(I).Y
            T=I+1
            DO WHILE(T.LE.WCOUNT)
               IF (WEST(T).Y.EQ.Y) THEN
                  WEST(T).X=WEST(WCOUNT).X
                  WEST(T).Y=WEST(WCOUNT).Y
                  T=WCOUNT
                  WCOUNT=WCOUNT-1
               ENDIF
               T=T+1
            END DO
            I=I+1
         END DO
C
         I=1
         DO WHILE (I.LT.NCOUNT)
            X=NORTH(I).X
            Y=NORTH(I).Y
            T=I+1
            DO WHILE(T.LE.NCOUNT)
               IF (NORTH(T).X.EQ.X) THEN
                  NORTH(T).X=NORTH(NCOUNT).X
                  NORTH(T).Y=NORTH(NCOUNT).Y
                  T=NCOUNT
                  NCOUNT=NCOUNT-1
               ENDIF
               T=T+1
            END DO
            I=I+1
         END DO
C
         I=1
         DO WHILE (I.LT.SCOUNT)
            X=SOUTH(I).X
            Y=SOUTH(I).Y
            T=I+1
            DO WHILE(T.LE.SCOUNT)
               IF (SOUTH(T).X.EQ.X) THEN
                  SOUTH(T).X=SOUTH(SCOUNT).X
```

```
                  SOUTH(T).Y=SOUTH(SCOUNT).Y
                  T=SCOUNT
                  SCOUNT=SCOUNT-1
               ENDIF
            T=T+1
            END DO
         I=I+1
         END DO
      END
C
      SUBROUTINE FIND_CLOSEST(POINT,PT,EDIT_DIST,MATCH)
C
C This routine locates the closest editnd that is within edit_dist of the
C supplied point.  If a match is fount PT is set to the index and MATCH is
C set to true
C
      INTEGER*2 ARC_MAX
      PARAMETER (ARC_MAX=1000)
      REAL*4 EDIT_DIST,DIST,SHORT_LENGTH,MINX,MAXX,DELTAX,DELTAY
      INTEGER*4 PT,LOW,HIGH,I,SHORT_INDEX
      LOGICAL*4 MATCH
      STRUCTURE /STRUC1/
      REAL*4 X
      REAL*4 Y
      END STRUCTURE
      RECORD /STRUC1/ POINT
C
      INTEGER*4 EDITCNT
      RECORD /STRUC1/ EDITND(ARC_MAX)
      COMMON /EDCOV/ EDITND,EDITCNT
C
C Start by locating bounds of the nodes to search
C
      MINX=POINT.X-EDIT_DIST
      MAXX=POINT.X+EDIT_DIST
C
C FIND THE LOW END OF EDITND to search.  We process sequentially from
C there
C
      LOW=1
      HIGH=EDITCNT
      PT=INT(FLOAT(HIGH+LOW)/2.0)
      DO WHILE(HIGH.GT.LOW)
         IF (EDITND(PT).X.GE.MINX) THEN
            HIGH=PT-1
         ELSE
            LOW=PT+1
         END IF
         PT=INT(FLOAT(HIGH+LOW)/2.0)
      END DO
      IF(PT.GT.1) PT=PT-1
      LOW=PT
C
C now search through node table and find closest node
C
      DELTAX= POINT.X-EDITND(PT).X
      DELTAY= POINT.Y-EDITND(PT).Y
      SHORT_LENGTH=SQRT( DELTAX**2 + DELTAY**2 )
      SHORT_INDEX=PT
      I=PT+1
      DO WHILE(EDITND(I).X.LE.MAXX.AND.I.LE.EDITCNT)
         DELTAX= POINT.X-EDITND(I).X
         DELTAY= POINT.Y-EDITND(I).Y
         DIST=SQRT( DELTAX**2 + DELTAY**2 )
         IF(DIST.LT.SHORT_LENGTH) THEN
            SHORT_INDEX=I
            SHORT_LENGTH=DIST
         ENDIF
         I=I+1
      END DO
C
C WE HAVE SHORTEST LENGTH BUT IS IT SHORT ENOUGH
C
```

```
            PT=SHORT_INDEX
            IF(SHORT_LENGTH.LE.EDIT_DIST) THEN
               MATCH=.TRUE.
            ELSE
               MATCH=.FALSE.
               ENDIF
            RETURN
            END
            INTEGER*4 FUNCTION IS_PSEUDO(COVER_PATH,USERX,USERY)
C
C     IS_PSEUDO     Version 1.0        TELEDYNE BROWN ENGINEERING
C                                      U.S ARMY STRATEGIC DEFENCE COMMAND
C
C
C
C   ———— . .
C
C     Purpose:  This subroutine tests whether the given location is a pseudo-r
C               This an expensive test and is only performed if the provided
C               location is about to cause a fatal autoedge error.  We simply
C               open the arc file testing the end nodes to see if they are the
C               same location.  If we have three or more arcs, we got trouble.
C               Two arcs is a pseudo node.  We cant have dangles as DLGs have
C               borders around the edges.
            INTEGER*4 I,CNT,ITEM_CHANNEL
            INTEGER*4 LBUFF,TYPE,IRECL,IERR
            CHARACTER*128 COVER_PATH,ARC_PATH,FULL_PATH
            REAL*4 USERX,USERY
            STRUCTURE /STRUC1/
            REAL*4 X
            REAL*4 Y
            END STRUCTURE
C
C   Arc structure,  This structure is used to store the arcs that are
C   read.
C
            INTEGER*4 RECORD_NUMBER,IN_CHANNEL
            STRUCTURE /STRUC4/
            INTEGER*4 USER_ID
            INTEGER*4 FROM_NODE
            INTEGER*4 TO_NODE
            INTEGER*4 LPOLY
            INTEGER*4 RPOLY
            INTEGER*4 NUM_POINTS
            RECORD /STRUC1/ POINTS(500)
            END STRUCTURE
            RECORD /STRUC4/ ARC_STRUCTURE
C
C  Get pathnames for coverage and to ARC file
C
            CNT = 0
            CALL ANAME(COVER_PATH,FULL_PATH,0)
            CALL ANAME(COVER_PATH,ARC_PATH,1)
C
C   Open the Arc file for when we need to read it.
C
            CALL VOPEN(IN_CHANNEL,ARC_PATH,TYPE,1,2,IRECL,IERR)
            IF(IERR.NE.0) THEN
               CALL FATAL('UNABLE TO OPEN ARC FILE FOR READING',-1)
               ENDIF CALL VREAD(IN_CHANNEL,RECORD_NUMBER,
     X                      ARC_STRUCTURE.USER_ID,LBUFF,IERR)
            DO WHILE(IERR.EQ.0)
C                  Now lets check nodes.
C
               IF ( (ARC_STRUCTURE.POINTS(1).X.EQ.USERX.AND.
     X            ARC_STRUCTURE.POINTS(1).Y.EQ.USERY).OR.
     X            (ARC_STRUCTURE.POINTS(ARC_STRUCTURE.NUM_POINTS).X
     X            .EQ.USERX.AND.
     X            ARC_STRUCTURE.POINTS(ARC_STRUCTURE.NUM_POINTS).Y
     X            .EQ.USERY))  CNT = CNT + 1
               CALL VREAD(IN_CHANNEL,RECORD_NUMBER,
     X                      ARC_STRUCTURE.USER_ID,LBUFF,IERR)
               END DO
```

```
      CALL VCLOSE(IN_CHANNEL)
      IS_PSEUDO=CNT
      END
&ARGS cov,hsize,vsize,hnum,vnum,OCV
/* FIX_JOIN.AML      VERSION 3.1            TELEDYNE BROWN ENGINEERING
/*                   Copywrite 1989 - Teledyne Brown Engineering
/*
/*                            VERSION 1.0
/*
/*
/* THIS PROGRAM ENSURES ALL ATTRIBUTE FILES HAVE THE SAME NUMBER OF MAJOR
/* MINOR CODES.
/*
/*                            VERSION 2.0
/*
/*
/*   Change: Program modified so that only one ARC ADDITEM is executed.
/*           The rest is accomplished by pat file modification
/*
/*
/*
/*
/*   Change: Program modified to combine fix_att and Join into one
/*           single aml
/*
/*                            Version 2.1
/*
/*
/*   Change: Program modified so that attribute files with more
/*           than 7 major minor codes wont distub additem
/*
/*                            Version 2.2
/*
/*
/*   Change: Combined Fix_aat and Join into a single AML
/*
/*                            Version 3.0
/*
/*
/*   Change: Combined Fix_aat pass and verification pass.
/*
/*                            Version 3.1
/*
/*
/*   Change: Modified to allow parameter arguments.  This allows this
/*           aml to be called by other amls.  Additionally removed use
/*           of global variables.
/*
/*                            Version 4.0
/*
/*   Change: Modified so that FIX_JOIN checks the DLGLINK.LOG file to see
/*           if one of its coverages is in the fatal link log file.  If
/*           it is, we set .LINK_ERROR to true and exit explaining why
/*           we are failing.
/*
/* Start a watch file, If one has not already been activated by the user
&IF [Show &watch] = &OFF &then &do
   &type Activating Watch file fix_join.WAT
   &watch fix_join.WAT &append
   &end
&else &type Using already activated watch [Show &watch]
&TYPE
&type FIX_JOIN version 4.0
&type
&type Copywrite 1989 - Teledyne Brown Engineering
&type
&typ  This program will correct the attribute files for the coverages and
&typ  optionally clean any coverage lacking correct toptology.  Finally
&typ  the coverages are appended into a single output coverage.
&typ
```

```
&IF [NULL %cov%] &THEN &S cov := [Response 'Enter South Eastern Coverage Nar
&TYPE
&if ^ [Exists %cov% -cover] &then &DO
    &TYPE %cov% does not exist
    &end
&s covTYPE := [substr %cov% [length %cov%] 1]
&s .ctype := [substr %cov% 1 1]
&s dd := [substr [before %cov% N] 2]
&s fract := [substr [after %cov% N] 1 1]
&select %fract%
    &when 0,5
        &s fract := %fract%00
    &when 1,6
        &s fract := %fract%25
    &when 2,7
        &s fract := %fract%50
    &when 3,8
        &s fract := %fract%75
    &end
&s dd_lat := %dd%.%fract%
&s dd := [substr [before [after %cov% N] W] 2]
&s fract := [substr [after %cov% W] 1 1]
&select %fract%
    &when 0,5
        &s fract := %fract%00
    &when 1,6
        &s fract := %fract%25
    &when 2,7
        &s fract := %fract%50
    &when 3,8
        &s fract := %fract%75
    &end
&s dd_long := %dd%.%fract%
/* We have the DD of the corner
/* We now have command and coverage type
/* Get remaining User INFO
&IF [NULL %hsize%] &THEN &s hsize := [Response 'Enter Horizontal size of cov
e in Decimal Degrees' .125]
&IF [NULL %vsize%] &THEN &s vsize := [Response 'Enter Vertical size of cover
in Decimal Degrees' .125]
&type
&IF [NULL %hnum%] &THEN &s hnum := [Response 'Enter number of Horizontal Cov
es' 8]
&IF [NULL %vnum%] &THEN &s vnum := [Response 'Enter number of Vertical Cover
' 4]
&type
&S PATH := [DIR [PATHNAME *]]
&S END := [LENGTH %PATH%] - 1
&S PATH := [QUOTE [SUBSTR %PATH% 1 %END% ]]
&IF [NULL %ocv%] &THEN &s OCV := [Response 'Enter Appended Output Coverage N
]
&type
&type FIX_JOIN started at [DATE -VFULL]
&type
&S aat_max := 1
&S pat_max := 1
&select %.ctype%
    &when H
        &do
        &s potion := POINT
        &if %covTYPE% = A &then &do
            &s potion := NET
            &s pat_max := 5
            &s aat_max := 4
            &end
        &if %covTYPE% = N &then &s pat_max := 2
        &if %covTYPE% = P &then &s pat_max := 2
        &end
    &when R
        &do
        &s potion := POINT
        &if %covTYPE% = A &then &do
            &s potion := LINE
            &s aat_max := 5
            &end
```

```
            &if %covTYPE% = N &then &s pat_max := 1
            &if %covTYPE% = P &then &s pat_max := 1
            &end
        &when M
            &do
            &s potion := POINT
            &if %covTYPE% = A &then &do
                &s potion := LINE
                &s aat_max := 2
                &end
            &if %covTYPE% = N &then &s pat_max := 1
            &if %covTYPE% = P &then &s pat_max := 1
            &end
        &when T
            &do
            &s potion := POINT
            &if %covTYPE% = A &then &do
                &s potion := LINE
                &s aat_max := 4
                &end
            &if %covTYPE% = N &then &s pat_max := 1
            &if %covTYPE% = P &then &s pat_max := 1
            &end
    &end
/*
/* Check to see if we have a DLGLINK.LOG file to check and if we are an A
/* type coverage.

&s .link_error := .FALSE.
&if [Exists DLGLINK.LOG -FILE] AND %covtype% = A &then &do
    &s unit := [Open DLGLINK.LOG STAT -READ]
    &S tcov := [Read %unit% stat]
    &do &while %stat% = 0 AND ^ %.link_error%
        &s dd := [substr [before %tcov% N] 2]
        &s fract := [substr [after %tcov% N] 1 1]
        &select %fract%
            &when 0,5
                &s fract := %fract%00
            &when 1,6
                &s fract := %fract%25
            &when 2,7
                &s fract := %fract%50
            &when 3,8
                &s fract := %fract%75
            &end
        &s tlat := %dd%.%fract%
        &s dd := [substr [before [after %tcov% N] W] 2]
        &s fract := [substr [after %tcov% W] 1 1]
        &select %fract%
            &when 0,5
                &s fract := %fract%00
            &when 1,6
                &s fract := %fract%25
            &when 2,7
                &s fract := %fract%50
            &when 3,8
                &s fract := %fract%75
            &end
        &s tlong := %dd%.%fract%
        &s dlon := %tlong% - %dd_long%
        &s dlat := %tlat% - %dd_lat%
        &if %dlon% lt 1 and %dlon% ge 0 and %dlat% lt 0.5 and %dlat% ge 0 &the
            &s .link_error := .TRUE.
            &type Failing FIX_JOIN because a coverage failed Auto Edge
            &s stat := [CLOSE %UNIT%]
            &return
            &end
        &S tcov := [Read %unit% stat]
        &end
    &s stat := [CLOSE %UNIT%]
    &end /* we have set all info lets fix aat files
```

```
/*
/* pat_max contains pat major minor count
/* aat_max conatains aat major minor count
/*
/*
&s first := .TRUE.
&s found := 0
&s pover := 0
&s aover := 0
/*
/* HERE is where we loop back if we find a coverage with more than we
/* currently handle
&label once_more
&S r := %hnum% - 1
&s c := %vnum% - 1
&do x := 0 &to %r%
    &do y := 0 &to %c%
        &s t_lat := %dd_lat% + ( %y% * %vsize% )
        &s t_long := %dd_long% + ( %x% * %hsize% )
        &call cov_name
        &TYPE COV %tcov%
        &if [Exists %tcov% -COVER] &then &do
            &s found := %found% + 1
            &if %potion% = NET &then &do
                &if ^ [exists %tcov% -clean] &then &do
                    clean %tcov% # 12.5 12.5 poly
                    &end           %tcov%                       60#
                &if ^ [exists %tcov% -line] &then &do
                    build %tcov%   .ne
                    &end     %tcov%  line
                &end
            &if ^ [Exists %tcov% -clean] or ^ [EXISTs %tcov% -%potion%] &then &
                &if %potion% = NET &then CLEAN %tcov% # 25 12.5 POLY
                &ELSE BUILD %tcov% %potion%
                &end
            &describe %tcov%
            &select %potion%
                &when NET
                    &do
                    &s start := ( %dsc$pat_bytes% - 16 ) / 12
                    /* start contains the number of major minor
                    /* codes
                    &if %start% > %pat_max% &then &do
                        &s pover := 1
                        &type %tcov% has %start% attributes
                        &s pat_max := %start%
                        &end
                    &if %start% < %pat_max% &then &call fix_pat
                    &s start := ( %dsc$aat_bytes% - 28 ) / 12
                    /* start contains the number of major minor
                    /* codes
                    &IF %start% > %aat_max% &then &do
                        &s aover := 1
                        &type %tcov% has %start% line attributes
                        &s aat_max := %start%
                        &end
                    &if %start% < %aat_max% &then &call fix_aat
                    &end
                &when POINT
                    &do
                    &s start := ( %dsc$xat_bytes% - 16 ) / 12
                    /* start contains the number of major minor
                    /* codes
                    &if %start% > %pat_max% &then &do
                        &s pover := 1
                        &type %tcov% has %start% attributes
                        &s pat_max := %start%
                        &end
                    &if %start% < %pat_max% &then &call fix_pat
                    &end
                &when LINE
                    &do
                    &s start := ( %dsc$aat_bytes% - 28 ) / 12
                    /* start contains the number of major minor
```

```
            /* codes
            &if %start% > %aat_max% &then &do
                &s aover := 1
                &type %tcov% has %start% line attributes
                &s aat_max := %start%
                &end
            &if %start% < %aat_max% &then &call fix_aat
            &end
        &end
    &end
&end
&if %first% AND ( %AOVER% > 0 OR %POVER% > 0 ) &then &do
    &s first := .FALSE.
    &TYPE ****** PASS 2 ******
    &goto once_more
    &end

/* READY TO JOIN

&if %found% eq 0 &then &do
    &type No coverages to be APPENDED !!!!!!!!!
    &return
    &end APPEND %OCV% %potion% ALL
&s r := %hnum% - 1
&s c := %vnum% - 1
&do x := 0 &to %r%
    &do y := 0 &to %c%
        /* check coverages and check for proper topology
        &s t_lat := %dd_lat% + ( %Y% * %vsize% )
        &s t_long := %dd_long% + ( %x% * %hsize% )
        &call cov_name
        &If [Exists %tcov% -coverage] &then &do
            &type Coverage %tcov%
[UNQUOTE %tcov%]
            &END
        &end
    &end
&TYPE END
[Unquote 'END']

&type
&type FIX_JOIN completed at [DATE -VFULL]
&type

&type Watch file [Show &watch] still active ...
&return
&routine cov_name
&s fract := [Substr [After %t_lat% .] 1 1]
&if [quote %fract%] < [quote 0] &then &s fract := 0
&s tcov := %.ctype%[before %t_lat% .]N%fract%
&s fract := [Substr [After %t_long% .] 1 1]
&if [quote %fract%] < [quote 0] &then &s fract := 0
&s tcov := %tcov%[before %t_long% .]W%fract%%covTYPE%
&return
&end &routine fix_pat
&s size := ( %pat_max% - %start% ) * 12
/* size contains number of Bytes to add ADDITEM %tcov%.PAT %tcov%.PAT T$IT %SIZE% %SIZE% C
&SETCHAR &FUNCTION # ?

&data arc info
ARC
SEL %tcov%.PAT
EXT
#UNQUOTE 'Y'?
#UNQUOTE ' '?
SEL %tcov%.PAT
MODIFY
```

```
N
#UNQUOTE 'L T$IT'?
#UNQUOTE 'D'?
#UNQUOTE 'I'?
&DO &WHILE %START% < %pat_max%
    &S START := %START% + 1
MAJOR%START%,6,I
MINOR%START%,6,I
    &END
#UNQUOTE ' '?
#UNQUOTE ' '?
EXT
#UNQUOTE %PATH%?.%tcov%]PAT.
SEL %tcov%.PAT
STOP STOP
&END
&SETCHAR &FUNCTION [ ]
&RETURN &routine fix_aat
&s size := ( %aat_max% - %start% ) * 12
/* size contains number of Bytes to add ADDITEM %tcov%.AAT %tcov%.AAT T$IT %SIZE% %SIZE% C
&SETCHAR &FUNCTION # ?

&data arc info
ARC
SEL %tcov%.AAT
EXT
#UNQUOTE 'Y'?
#UNQUOTE ' '?
SEL %tcov%.AAT
MODIFY
N
#UNQUOTE 'L T$IT'?
#UNQUOTE 'D'?
#UNQUOTE 'I'?
&DO &WHILE %START% < %aat_max%
    &S START := %START% + 1
MAJOR%START%,6,I
MINOR%START%,6,I
    &END
#UNQUOTE ' '?
#UNQUOTE ' '?
EXT
#UNQUOTE %PATH%?.%tcov%]AAT.
SEL %tcov%.AAT
STOP STOP
&END
&SETCHAR &FUNCTION [ ]
&RETURN
```

DLG_CONVERSION Algorithm

1.     Set Error handling to fail.

2.     Get User run time parameters.

base_name <= *file to convert*
        start_version <= *starting file number to convert.*
        end_version <= *last file number to convert.*

3.     Display run time parameters.

4.     See if user parameters are acceptable. GOTO 2 if parameters are not acceptable.

5.     Get workspace pathname parameters. Each type of layer is stored in a separate workspace. This enhances performance.

| | |
|---|---|
| 6 | Display workspaces.  If not acceptable GOTO 5 |
| 7 | Process each DLG file from start_version to end_version.  Do while start_version LE end_version |
| 7.1 | Call read_dlg_headder.  This routine reads through the DLG file determining the type of layer, UTM zone, and latitude longitude coordinates of the southeast corner of the coverage.  This information is used to generate the coverage name. |
| 7.2 | If coverage has not already been converted and no error was encountered during read_dlg_header then do. |
| 7.2.1 | Kill temporary coverages. |
| 7.2.2 | Use DLGARCC command to produce coverages: T$A, T$N, and T$P. |
| 7.2.3 | If Polygon topology exists. (T$A.PCODE exists) |
| 7.2.3.1 | Build T$A with polygon option. |
| 7.2.3.2 | JOINITEM T$A.PAT with T$A.PCODE |
| 7.2.4 | If Line topology exists. (T$A.ACODE exists) |
| 7.2.4.1 | Build T$A with line option. |
| 7.2.4.2 | JOINITEM T$A.AAT with T$A.ACODE |
| 7.2.5 | If Point topology exists. (T$P.XCODE exists) |
| 7.2.5.1 | Build T$P with point option. |
| 7.2.5.2 | JOINITEM T$P.PAT with T$P.XCODE |
| 7.2.6 | If Node topology exists. (T$N.NCODE exists) |
| 7.2.6.1 | Build T$N with point option. |
| 7.2.6.2 | JOINITEM T$N.PAT with T$N.NCODE |
| 7.2.7 | If coverage is a hydrology coverage |
| 7.2.7.1 | If cover lacks polygon topology |
| 7.2.7.1.1 | Build with polygon option. |
| 7.2.7.2 | If cover lacks line topology |
| 7.2.7.2.1 | Build with line option. |
| 7.2.7.2.2 | Add MAJOR1 and MINOR1 attribute codes to line attribute file. |
| 7.2.7.2.3 | Code all lines as -9999 to indicate lines are border arcs. |
| 7.2.8 | Remove temporary DLG attribute files: T$A.PCODE, T$A.ACODE, T$P.XCODE andT$N.XOCDE. |
| 7.2.9 | If T$A coverage exists. |

| | |
|---|---|
| 7.2.9.1 | Project coverage to user output projection system and call T$ALB. |
| 7.2.10 | If T$P coverage exists. |
| 7.2.10.1 | Project coverage to user output projection system and store in appropriate workspace with file naming conventions. |
| 7.2.11 | If T$N coverage exists. |
| 7.2.11.1 | Project coverage to user output projection system and store in appropriate workspace with file naming conventions. |
| 7.2.12 | If T$ALB coverage exists. |
| 7.2.12.1 | Re-build topology. |
| 7.2.12.2 | Set fuzzy tolerance default values. |
| 7.2.12.3 | Copy into user workspace with naming conventions. |
| 7.3 | start_version <= start_version + 1 |
| 7.4 | End do While start_version LE end_version |
| 8. | End |

Routine Read_DLG_HEADER

| | |
|---|---|
| 1 | Create DLG file name by concatenating Base_name and start_version. |
| 2 | If DLG_FILE does not exist. |
| 2.1 | Return with failure status. |
| 3 | Open DLG_FILE for reading |
| 4 | Read line 2 columns 53-60.  This contains map scale.  This is used for setting tolerances. |
| 5 | Read line 4 columns 13-18.  This contains UTM Zone to use for projection. |
| 6 | Read line 14.  This contains SE corner of maps Latitude and Longitude coordinates. |
| 7 | Contruct 10 character caverage name base using LAT, LONG coordinates. ex ( 103W036N2 ) |
| 8 | Read line 15.  This contains the coverage type. This is used to set a single character of the naming convention indicating map type.<br><br>H = Hydrology        R = Roads<br>T = Trains ( railroads ) M = Misc Transportation |
| 9 | Output coverage name equals<br>WORKSPACE \|\| layer type \|\| Geographic location<br><br>(ex. [.HYDRO]H103W036N2 ) |
| 10 | Close DLG file. |
| 11 | Return with succesful status. |

DLGLINK.AML

1. Open Watch File

2. Accept user run time parameters
   - COV <- Soth east Coverage
   - HSIZE <- Horizontal coverage size
   - VSIZE <- Vertical coverage size
   - HNUM <- Number of horizontal coverages
   - VNUM <- Number of vertical coverages 3. Parse COV, determining layer_type, Latitude, and Longitude.

4. DO x = 0 to HNUM by 2

4.1. DO y = 0 to VNUM by 2

4.1.1. T_LAT <- LATITUDE + ( Y * VSIZE )

4.1.2. T_LONG <- LONGITUDE + ( X * HSIZE )

4.1.3. Generate editcoverage from T_LAT and T_LONG 4.1.4. IF exist editcoverage 4.1.4.1. Generate back coverage names
   - ecov <- coverage to east of editcov
   - wcov <- coverage to west of editcov
   - ncov <- coverage to north of editcov
   - scov <- coverage to south of editcov 4.1.4.2. If exist file FATA.ERROR ... delete it 4.1.4.3. Create file FATAL.ERROR, if this file is not gone when autolink fortran program completes, a fatal error was encountered.

4.1.4.4. Execute AUTO_LINK FORTRAN program. It will create a program which when executed will call ARCEDIT, set-up adjustment links and AUTOLINK.

4.1.4.5. If exists FATAL.ERROR, report error and fail.

4.1.5. end FOR y = 0 to VNUM 4.2. end FOR x = 0 to HNUM

5. Repeat steps 4 through 4.2 except change do loops
   - Do x = 1 to HNUM by 2
   - Do y = 1 to VNUM by 2

This will edgematch the remaining diagonal coverages needed to edgematch an entire block.

6. Close watch file 7. end

AUTO_LINK.FOR

1. Initialize ARC/INFO subsystem

2. Read user parameters
   - EDITCOV <- Edit coverage
   - ECOV <- East border coverage
   - WCOV <- West border coverage
   - NCOV <- North border coverage
   - SCOV <- South border coverage

| | |
|---|---|
| 3 | Call PROC_COV ( EDITCOV )    /* Read editcov nodes |
| 4 | Sort EDITCOV Nodes in X,Y order |
| 5 | BAD_EDGE <- .FALSE.  /* If bad_edge becomes true, the coverage can not be autolinked. |
| 6 | Create basic AML program. This includes cammands necessary to start ARCEDIT, set-up editcov, set editfeature, and enter ADD for links. |
| 7 | If ECOV ne "NONE" |
| 7.1 | CALL PROC_COV (ECOV) |
| 7.2 | DO i = 1 to number of nodes on west edge |
| 7.2.1 | CALL FIND_CLOSEST (Node(i)) |
| 7.2.2 | if these match then Write LINK to AML file |
| 7.2.3 | ELSE |
| 7.2.3.1 | change match distance to 5 * editdistance |
| 7.2.3.2 | CALL FIND_CLOSEST (Node(i)) |
| 7.2.3.3 | if these match then BAD_EDGE = .TRUE. |
| 7.2.3.4 | ELSE Write link to AML File |
| 7.3 | End do loop |
| 8 | Repeat step 7 through 7.3 for WCOV |
| 9 | Repeat steps 7 through 7.3 for NCOV |
| 10 | Repeat steps 7 through 7.3 for SCOV |
| 11 | If Bad_Edge = .FALSE. |
| 11.1 | Write commands to adjust and save to AML file |
| 12 | Else |
| 12.1 | Log coverage not auto-edgematched |
| 12.2 | Write commands save and quit to AML file |
| 13 | Close AML file |
| 14 | END |

Subroutines

PROC_COV (COVER)

| | |
|---|---|
| 1 | Open and read through AAT attribute file. If the arc is coded less than 0, it is a border arc. |
| 2 | Read the corresponding arcs in and record the nodes. |
| 3 | Generate coordinates for center of coverage from then coverage BND. |

| | |
|---|---|
| 4 | Using the arcs SLOPE as well as coverage center point, divide the arcs into four classes: EAST, WEST, NORTH, and SOUTH edges. |
| 5 | Close all files |
| 6 | RETURN |

FIND_CLOSEST(NODE,MNODE,EDITDIST,MATCH)

| | |
|---|---|
| 1 | Searches the editcoverage node table. The node with the closest distance is assigned to MNODE. If no match is found MATCH is set to FALSE otherwise it is set to true. Search is using a binary search. |
| 2 | RETURN |

Fix_Join Algorithm

| | |
|---|---|
| 1 | Open watch file. |
| 2 | Obtain name of Southeastern coverage. |
| 3 | Parse coverage name to obtain: Layer_type, latitude longitude location, and coverage type. |
| 4 | Get user run time parameters.<br><br>Hsize <= Horizontal coverage size.<br>Vsize <= Vertical coverage size<br>Hnum <= Number of horizontal coverages.<br>Vnum <= Number of vertical coverages. |
| 5 | Set default number of MAJOR, MINOR code pairs for attribute files. These values vary depending on coverage type and layer type. |
| 6 | Repeat loop until all attribute files have same number of MAJOR,MINOR code pairs. |
| 6.1 | r <= hnum - 1 , c <= vnum - 1 |
| 6.2 | Do x = 0 to R |
| 6.2.1 | Do y = 0 to C |
| 6.2.1.1 | T_lat <= latitude of SE corner + (y*vsize)<br>T_long <= Longitude of SE corner + x*hsize |
| 6.2.1.2 | Generate coverage name from T_lat and T_long. |
| 6.2.1.3 | If coverage exists as a Network coverage. |
| 6.2.1.3.1 | If coverage is not clean |
| 6.2.1.3.1.1 | Clean with polygon option |
| 6.2.1.3.2 | If coverage lacks line topology |
| 6.2.1.3.2.1 | Clean with Line option |
| 6.2.1.4 | Describe coverage |

| | |
|---|---|
| 6.2.1.5 | Take number of attibute bytes, subtract 16 and divide by 12 for PAT files. Subtract 28 for AAT files. This provides the number of MAJOR MINOR codes in the coverage. |
| 6.2.1.6 | If number of attributes does not match PAT_MAX or AAT_MAX |
| 6.2.1.6.1 | Add a single item for all missing attribute pairs. A single ADDITEM command is used to minimize I/O overhead. |
| 6.2.1.6.2 | Use INFO database manager to change the single added item into the required number of MAJOR, MINOR codes. |
| 6.2.1.7 | End for Do loop Y = 0 to C |
| 6.2.2 | End for Do loop X = 0 to R |
| 6.3 | If any attribte files had more attribute pairs than the default, up PAT_MAX and AAT_MAX to higher amount. |
| 6.4 | End Repeat until all attribute files uniform. |
| 7 | APPEND into a single output coverage. |
| 8 | Do X = 0 to R |
| 8.1 | Do Y = 0 to C |
| 8.1.1 | T_lat <= latitude of SE corner + (y*vsize)<br>T_long <= Longitude of SE corner + x*hsize |
| 8.1.2 | Generate coverage name from T_lat and T_long. |
| 8.1.3 | If coverage exists |
| 8.1.3.1 | Pass coverage name to APPEND |
| 8.1.4 | End for Do loop Y = 0 to C |
| 8.2 | End for Do Loop X = 0 to R |
| 9 | End |

I claim:

1. A computerized method of producing a map from a plurality of small map sections, said small map sections being in digital line graph format, the method comprising:
   (a) receiving data corresponding to geographical features on the earth's surface as raw map data, said raw map data relating to small sections of the earth's surface in digital line graph format;
   (b) locating the north, south, east and west border arcs in said raw map data, wherein said border arcs include nodes along the border arc;
   (c) converting said raw map data into a format which identifies the latitude and longitudinal coordinates, and a type of map coverage;
   (d) edgematching each node along the border arc of one map section to its adjacent map sections by matching the nodes along the border arc with the most closely corresponding node along an adjacent border arc, within a predetermined tolerance distance;
   (e) snapping said node of said one map section to said most closely corresponding node along said adjacent border arc;
   (f) repeating steps (b), (c), (d), and (e) for each border of said one map section, with its corresponding adjacent border on the adjacent map section;
   (g) repeating steps (b) through (f) until all of the edges of the small map sections are matched;
   (h) joining said small map sections at the matched edges; and
   (i) producing a final map product from the joined small map sections.

2. A method of producing a map according to claim 1, wherein the edgematching in step (d) includes the following steps:
   (d)(1) edgematching each node along the border arc of one map section to its adjacent map sections by matching the nodes with the most closely corresponding node, within a predetermined range and the predetermined tolerance distance;
   (d)(2) if no match for a node is found within the predetermined range and within the predetermined tolerance distance, edgematching the unmatched nodes along the border arc with the nodes having the most closely corresponding node, within said predetermined range, along the adjacent border arc within an expanded tolerance distance; and
   (d)(3) if no match for a node is found within the predetermined range and within the expanded tolerance distance, indicate a matching error.

3. A method of producing a map according to claim 1, wherein said type of map coverages are chosen from the group consisting of: hydrology coverage, road coverage, railroad coverage, and miscellaneous transportation coverage.

4. A method of producing a map according to claim 3, wherein said final map product includes at least two of said map coverages, one superimposed over the other.

5. A method of producing a map according to claim 2, wherein the expanded tolerance distance is five times the predetermined tolerance distance.

6. A method of producing a map according to claim 1, wherein the converted data of step (c) is put into the following format:

AwwBxyyyCzD, wherein:
   A represents a coverage type and is selected from the group consisting of H, R, T, or M, which stand for Hydrology, Roads, Trains or Miscellaneous transportation, respectively;
   ww represents a number from 0 to 90 which stands for the number of degrees latitude from the equator of a southeastern corner of the small map sections;
   B represents a direction selected from the group consisting of N or S, which stand for North or South of the equator, respectively;
   x represents a decimal degree selected from the group of 0, 1, 2, 3, 5, 6, 7, or 8, which stand for 0.0 degrees, 0.125 degrees, 0.25 degrees, 0.375 degrees, 0.5 degrees, 0.625 degrees, 0.75 degrees and 0.875 degrees, respectively;
   yyy represents a number from 0 to 180 which stands for the number of degrees longitude from the prime meridian in Greenwich of the southeastern corner of the small map sections;
   C represents a direction selected from the group consisting of W or E, which stand for West or East of the prime meridian in Greenwich, respectively;
   z represents a decimal degree selected from the group of 0, 1, 2, 3, 5, 6, 7, or 8, which stand for 0.0 degrees, 0.125 degrees, 0.25 degrees, 0.375 degrees, 0.5 degrees, 0.625 degrees, 0.75 degrees and 0.875 degrees, respectively; and
   D represents a type of data to be converted into and is selected from the group consisting of A, P, or N, which stand for Area, Points or Nodes, respectively.

7. A computerized method for producing a map from a plurality of small map sections, said small map sections being in digital line graph format, the method comprising:
   (a) inputting data into a computer corresponding to geographical features on the earth's surface as raw map data, said raw map data relating to small sections of the earth's surface in digital line graph format;
   (b) locating border arcs in said raw map data, wherein said border arcs include nodes along the border arc;
   (c) converting said raw map data into a format which identifies the latitude and longitudinal coordinates, and a type of map coverage;
   (d) edgematching each node along the border arc of one map section to its adjacent map sections by matching the nodes along the border arc with the most closely corresponding node along an adjacent border arc, within a predetermined range and a predetermined tolerance distance;
   (e) using the computer, repeating steps (b)., (c), and (d), for each border of said one map section, with its corresponding adjacent border on the adjacent map section;
   (f) using the computer, repeating steps (b) through (e) until all of the edges of the small map sections are matched;
   (g) joining said small map sections at the matched edges; and
   (h) producing a map product from the joined small map sections.

8. A method of producing a map according to claim 7, wherein the edgematching in step (d) includes the following steps:

(d) 1) edgematching each node along the border arc of one map section to its adjacent map sections by matching the nodes with the most closely corresponding node, within the predetermined range and the predetermined tolerance distance;

(d) (2) if no match for a node is found within the predetermined range and within the predetermined tolerance distance, edgematching the unmatched nodes along the border arc with the nodes having the most closely corresponding node, within said predetermined range, along the adjacent border arc within an expanded tolerance distance; and (d) (3) if no match for a node is found within the predetermined range and within the expanded tolerance distance, indicate a matching error.

9. A method of producing a map according to claim 8, wherein the expanded tolerance distance is five times the predetermined tolerance distance.

10. A method of producing a map according to claim 7, wherein said type of map coverages are chosen from the group consisting of: hydrology coverage, road coverage, railroad coverage, and miscellaneous transportation coverage.

11. A method of producing a map according to claim 10, wherein said final map product includes at least two of said map coverages, one superimposed over the other.

12. A method of producing a map according to claim 7, wherein the converted data of step (c) is put into the following format:

AwwBxyyyCzD, wherein:

A represents a coverage type and is selected from the group consisting of H, R, T, or M, which stand for Hydrology, Roads, Trains or Miscellaneous transportation, respectively;

ww represents a number form 0 to 90 which stands for the number of degrees latitude from the equator of a southeastern corner of the small map sections;

B represents a direction selected from the group consisting of N or S, which stand for North or South of the equator, respectively;

x represents a decimal degree selected from the group of 0, 1, 2, 3, 5, 6, 7, or 8, which stand for 0.0 degrees, 0.125 degrees, 0.25 degrees, 0.375 degrees, 0.5 degrees, 0.625 degrees, 0.75 degrees and 0.875 degrees, respectively;

yyy represents a number form 0 to 180 which stands for the number of degrees longitudinal from the prime meridian in Greenwich of the southeastern corner of the small map sections;

C represents a direction selected from the group consisting of W or E, which stand for West or East of the prime meridian in Greenwich, respectively;

z represents a decimal degree selected from the group of 0, 1, 2, 3, 5, 6, 7, or 8, which stand for 0.0 degrees, 0.125 degrees, 0.25 degrees, 0.375 degrees, 0.5 degrees, 0.625 degrees, 0.75 degrees and 0.875 degrees, respectively; and D represents a type of data to be converted into and is selected from the group consisting of A, P, or N, which stand for Area, Points or Nodes, respectively.

* * * * *